(12) United States Patent
Kaewell, Jr. et al.

(10) Patent No.: US 7,415,043 B2
(45) Date of Patent: Aug. 19, 2008

(54) CODE DIVISION MULTIPLE ACCESS (CDMA) METHOD AND APPARATUS FOR PROTECTING AND AUTHENTICATING WIRELESSLY TRANSMITTED DIGITAL INFORMATION

(75) Inventors: John David Kaewell, Jr., Jamison, PA (US); Prabhakar R. Chitrapu, Blue Bell, PA (US); Robert Lind Olesen, Huntington, NY (US); Sung-Hyuk Shin, Northvale, NJ (US); John Erich Hoffmann, Indialantic, FL (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 432 days.

(21) Appl. No.: 11/034,987

(22) Filed: Jan. 13, 2005

(65) Prior Publication Data

US 2005/0195769 A1    Sep. 8, 2005

Related U.S. Application Data

(60) Provisional application No. 60/536,144, filed on Jan. 13, 2004, provisional application No. 60/536,133, filed on Jan. 13, 2004.

(51) Int. Cl.
*H04J 13/00* (2006.01)
(52) U.S. Cl. ................ 370/479; 370/335; 370/342; 370/208; 380/31; 380/32; 380/33; 380/34
(58) Field of Classification Search ................ 370/330, 370/335, 336, 337, 342, 343–345, 347, 389, 370/395.32, 464, 469, 478–80, 204, 208; 709/226, 227, 229, 230; 455/63.1, 63.3, 455/296, 446, 447, 501; 380/31–34, 247, 380/252–54
See application file for complete search history.

(56) References Cited

U.S. PATENT DOCUMENTS

| | | | |
|---|---|---|---|
| 5,201,000 A | | 4/1993 | Matyas et al. |
| 5,274,666 A | | 12/1993 | Dowdell et al. |
| 5,568,483 A | * | 10/1996 | Padovani et al. ............ 370/468 |
| 5,872,519 A | * | 2/1999 | Issa et al. ............... 340/825.01 |
| 5,953,424 A | | 9/1999 | Vogelesang et al. |

(Continued)

OTHER PUBLICATIONS

Sanzgiri et al., "A Secure Routing Protocol for Ad Hoc Networks", Proceedings of the 10th IEEE International Conference on Network Protocols (ICNP '02), IEEE, 2002, pp. 1-10.

(Continued)

*Primary Examiner*—Wing F. Chan
*Assistant Examiner*—Mark A. Mais
(74) *Attorney, Agent, or Firm*—Volpe and Koenig, P.C.

(57) ABSTRACT

A spread spectrum method and apparatus for protecting and authenticating wirelessly transmitted digital information using numerous techniques. The apparatus may be a wireless code division multiple access (CDMA) communication system, a base station, a wireless transmit/receive unit (WTRU), a transmitter, a receiver and/or an integrated circuit (IC). The wireless CDMA communication system includes a transmitter which steganographically embeds digital information in a CDMA communication signal and wirelessly transmits the CDMA communication signal. The system further includes a receiver which receives the CDMA communication signal and extracts the steganographically embedded digital information from the received CDMA communication signal.

101 Claims, 15 Drawing Sheets

U.S. PATENT DOCUMENTS

| | | | |
|---|---|---|---|
| 6,115,580 | A | 9/2000 | Chuprun et al. |
| 6,359,998 | B1* | 3/2002 | Cooklev .................... 382/100 |
| 6,492,897 | B1 | 12/2002 | Mowery, Jr. |
| 6,728,323 | B1* | 4/2004 | Chen et al. .................. 375/340 |
| 6,880,009 | B2* | 4/2005 | Charas ....................... 709/226 |
| 6,915,002 | B2* | 7/2005 | Gustafson .................. 382/100 |
| 6,928,287 | B2* | 8/2005 | Trott et al. .................. 455/447 |
| 6,937,843 | B2* | 8/2005 | Foschini et al. ................. 455/1 |
| 7,171,020 | B2* | 1/2007 | Rhoads et al. ............. 382/100 |
| 7,266,217 | B2* | 9/2007 | Rhoads et al. ............. 382/100 |
| 2003/0009683 | A1 | 1/2003 | Schwenck et al. |
| 2003/0030680 | A1 | 2/2003 | Cofta et al. |
| 2003/0072450 | A1 | 4/2003 | Maggenti |
| 2003/0086371 | A1 | 5/2003 | Walton et al. |
| 2003/0123659 | A1 | 7/2003 | Forstrom et al. |
| 2003/0174858 | A1 | 9/2003 | Kim et al. |
| 2004/0081131 | A1 | 4/2004 | Walton et al. |
| 2005/0180315 | A1* | 8/2005 | Chitrapu et al. ............. 370/208 |
| 2005/0220322 | A1* | 10/2005 | Olesen et al. ............... 382/100 |
| 2006/0156009 | A1* | 7/2006 | Shin et al. .................. 713/176 |
| 2006/0200673 | A1* | 9/2006 | Zhang et al. ................ 713/176 |
| 2007/0121939 | A1* | 5/2007 | Olesen et al. ............... 380/201 |

OTHER PUBLICATIONS

Arslanagic, "Personal Firewall in Mobile Phone", Masters Thesis in Information and Communication Technology, Agder University College Faculty of Engineering and Science, Grimstad, Norway, May 2004.

Schneier, Bruce "Applied Cryptography" Second Edition, 1996, pp. 180 and 426-480.

Menezes, Alfred J. et al. "Handbook of Applied Cryptogaphyy", 1997, p. 172.

Sanzgiri et al., "A Secure Routing Protocol for Ad Hoc Networks", Proceedings of the 10th IEEE International Conference on Network Protocols (ICNP '98), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Menezes, Alfred J. et al. "Handbook of Applied Cryptogaphyy", 1997, p. 172.

* cited by examiner

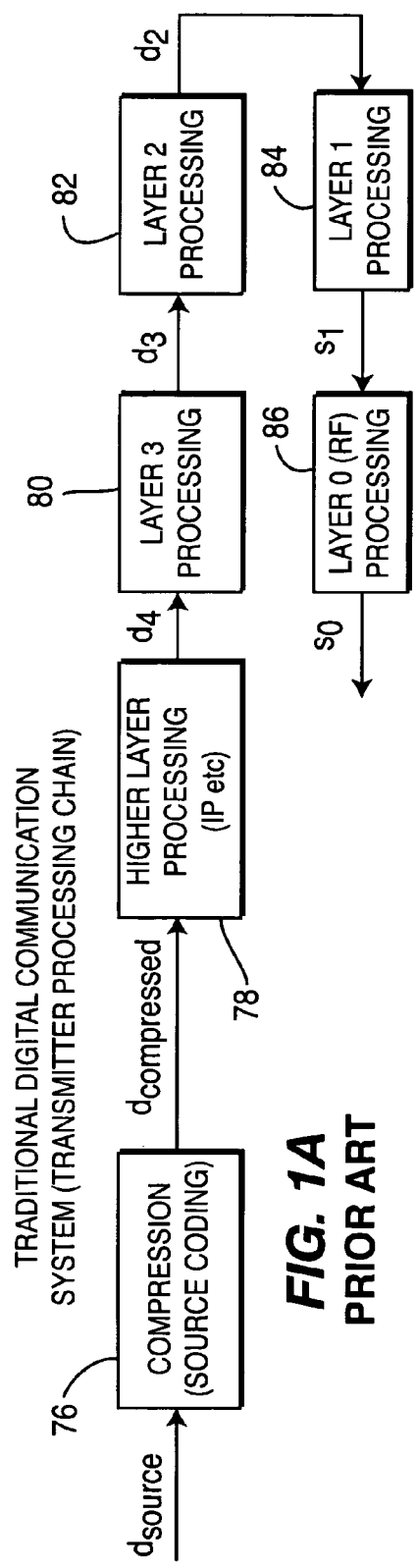
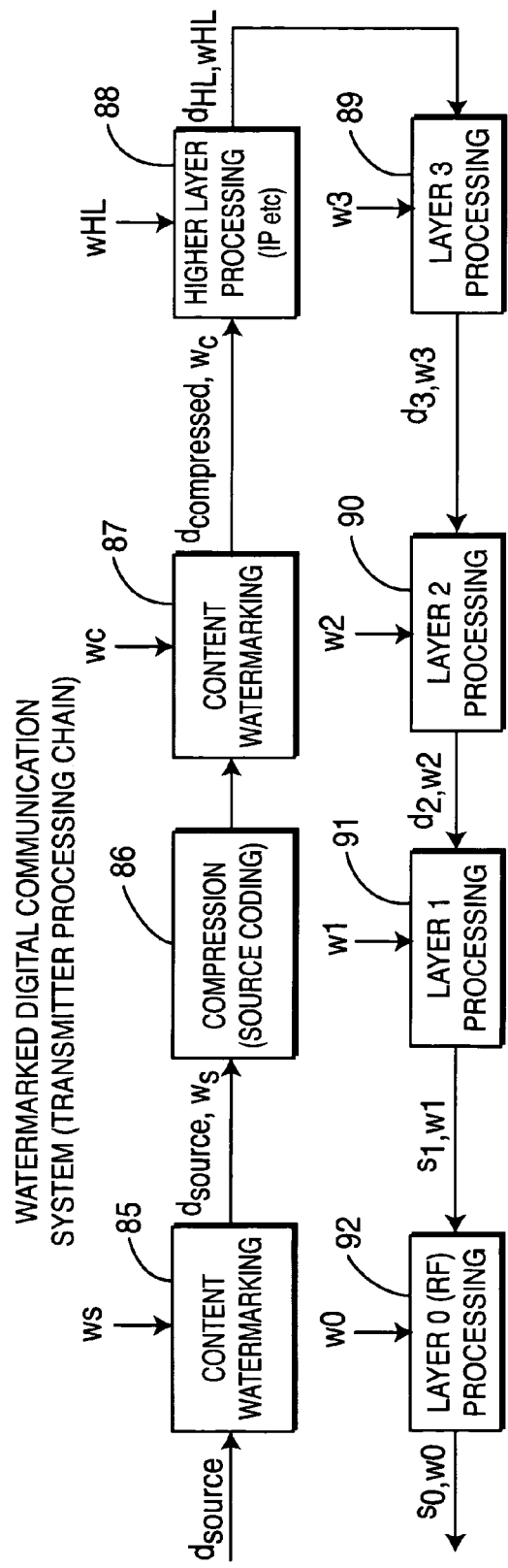
FIG. 1A PRIOR ART
FIG. 1B

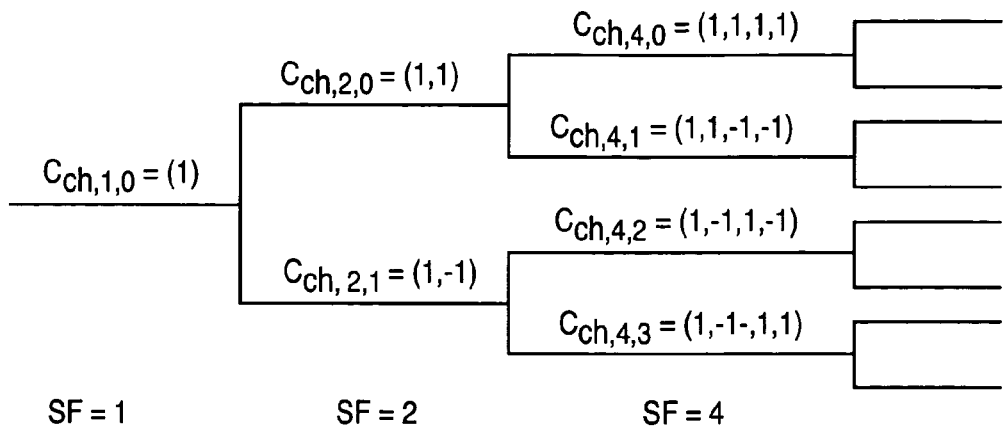
FIG. 11
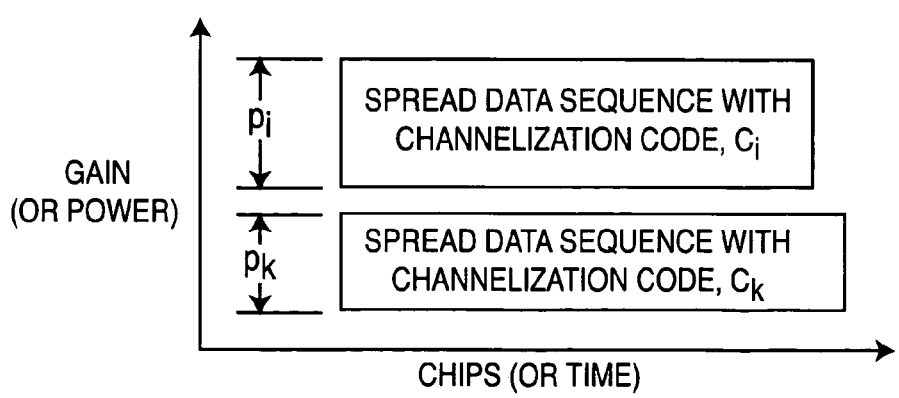
FIG. 12
FIG. 13

A, C - FREQUENCY SUB-GROUP 1
B, D - FREQUENCY SUB-GROUP 2

CODE DIVISION MULTIPLE ACCESS (CDMA) METHOD AND APPARATUS FOR PROTECTING AND AUTHENTICATING WIRELESSLY TRANSMITTED DIGITAL INFORMATION

CROSS REFERENCE TO RELATED APPLICATION

This application claims the benefit of U.S. Provisional Application No. 60/536,133 filed Jan. 13, 2004 and U.S. Provisional Application No. 60/536,144 filed Jan. 13, 2004, which are incorporated by reference as if fully set forth.

FIELD OF INVENTION

The present invention is related to a wireless communication system. More particularly, the present invention is related to using SS techniques, e.g., code division multiple access (CDMA), to protect and authenticate digital information transmitted to and received from a user's wireless transmit/receive unit (WTRU).

BACKGROUND

Wireless systems are susceptible in many respects. These susceptibilities are increasing as new wireless technologies are growing in prevalence. Ad-hoc networks, where individual users communicate with each other directly without using intermediary network nodes, creates new susceptibilities to the users and networks. These susceptibilities can be categorized as "trust", "rights", "identity", "privacy" and "security" related issues.

"Trust" refers to the assurance that information communicated in these systems can be shared. To illustrate, a wireless user may want to know that a communication was sent to it from a trusted source and using trusted communication nodes. The user in an ad-hoc network may have no knowledge that the communication was transferred over a hacker's wireless device with packet sniffing software. Additionally, with the use of tunneling, intermediate nodes transferring the communication may be transparent to the wireless user.

"Rights" ("rights management") refers to the control of data. To illustrate, one wireless user may have limited rights in a wireless system. However, if that user colludes (knowingly or unknowingly) with a second node having superior rights, that user may gain rights above those that the user is allowed.

"Identity" refers to the control linked to the identity of the wireless user. To illustrate, a rogue wireless device may attempt to access a wireless network by pretending to be an authorized user of the network, by using that authorized user's identity. "Privacy" refers to maintaining privacy of the individual, data and context. A wireless user may not want others to know, which web sites he/she visits and, in particular, information sent to these sites, such as financial, medical, etc. "Security" refers to the security of the data and context, such as preventing an unauthorized individual access to a wireless user's information.

To reduce the susceptibility of wireless networks, various techniques are used. Although these techniques provide some protection, they are still susceptible to the trusts, rights, identity, privacy and security issued. For example, although a particular wireless communication node may have the correct keys to communicate with a wireless user, that user may not know whether the node can be trusted.

Additionally, authentication of the user using these keys typically occurs at higher layers of the communication stack. Accordingly, even when these controls are in place, a rogue wireless user or hacker may have some (although limited) access to the communication stack. This access creates vulnerabilities, such as to denial of service attacks, among others.

Steganography is the art of passing information in a manner that the very existence of the message is unknown. The goal of steganography is to avoid drawing suspicion to the transmission of a hidden message. If suspicion is raised, then this goal is defeated. Steganography encompasses methods of transmitting secret messages through innocuous cover carriers in such a manner that the very existence of the embedded messages is undetectable. Creative methods have been devised in the hiding process to reduce the visible detection of the embedded messages.

Watermarking is a well-known technique for protecting and tracking digital information, which has been successfully exploited in the area of music and video data storage and communication. The traditional framework for watermarking consists of three elements: 1) cover signal s, 2) watermark w, 3) embedding function E and 4) secret key k. The watermarked signal is then defined as $s_w = E_k\{s,w\}$. The watermark carrying signal $s_w$ must be robust to common signal processing operations such as filtering, compression or any other operation that are the basic functionalities of the network. Robustness is defined by the ability to extract the watermark from an altered signal. The second requirement of any watermarking scheme is imperceptibility, (i.e., the difference between s and $s_w$ must not alter the operation of the system in any perceptible manner). The watermark must also be transparent in the sense that the watermark-unaware portions of the network must be able to process $s_w$ without additional hardware or software. The watermark must also be secure even though the watermarking algorithm itself may be public. This security is frequently achieved through a secret key that is exchanged with the receiver through some form of secure key exchange.

In the prior art, the concept of digital watermarking is used in information assurance and User Authentication. A watermark is embedded into the user data, which is then transported by the physical layer of the communication link. The recipient extracts the watermark and compares it with a local copy to authenticate the transmitter.

Watermarks and signatures are techniques for adding metadata or unique information to media for signaling and/or security purposes. To reduce these susceptibilities to wireless communications, it is desirable to have alternate approaches to watermarking and adding signatures to wireless communications.

SUMMARY

The present invention is related to a spread spectrum method and apparatus for protecting and authenticating wirelessly transmitted digital information using numerous techniques. The apparatus may be a wireless CDMA communication system, a base station, a WTRU, a transmitter, a receiver and/or an integrated circuit (IC).

The wireless CDMA communication system includes a transmitter which steganographically embeds digital information in a CDMA communication signal and wirelessly transmits the CDMA communication signal. The system further includes a receiver which receives the CDMA communication signal and extracts the steganographically embedded digital information from the received CDMA communication signal. The digital information may comprise at least one token, at least one key, at least one watermark or at least one signature.

The transmitter may embed the digital information in a frame quality indicator. The frame quality indicator may include a cyclic redundancy check (CRC).

The transmitter may embed the digital information in at least one encoder tail bit or at least one reserved/erasure indicator.

In one embodiment, at the transmitter, a slow scrambled code jitter is applied with respect to a carrier frequency and frequency-shift keying (FSK) modulation of the digital information placed on top of the jitter. The digital information may be mapped to a predefined frequency offset. At the receiver, a local descrambler in the receiver is synchronized to generate the same code jitter and a local carrier demodulator is then synchronized to generate the mapped/applied frequency offset.

In another embodiment, at the transmitter, particular chips are selected in at least one of a scrambling code and a channelization code, and the digital information is embedded in the selected chips. At the receiver, the particular chips are determined and the digital information is extracted from the particular chips.

In yet another embodiment, at the transmitter, the digital information is mapped to physical channel combinations based on at least one channelization code and a spreading factor (SF) according to a predefined rule. The channelization code may be an orthogonal variable spreading factor (OVSF) code.

In yet another embodiment, the digital information is represented as a relative gain or power offset between any pair of channelization codes.

In yet another embodiment, the digital information is mapped as a delay of a channelization code transmission.

In yet another embodiment, the transmitter may embed the digital information in a pilot channel and/or in certain pilot symbols in the pilot channel. The receiver may extract the digital information from the certain pilot symbols in the pilot channel.

In yet another embodiment, the transmitter may embed the digital information in a control channel or a data channel.

In yet another embodiment, the transmitter includes two antennas, and the transmitter embeds the digital information in two different data symbols every other symbol period. The two different data symbols are simultaneously transmitted by the respective ones of the two antennas.

In yet another embodiment, the digital information is directly transported by defining a new physical channel or field.

In yet another embodiment, the digital information is treated as dirty paper coding (DPC) encoded information, and any other CDMA signals are treated as side information.

In yet another embodiment, bits of the digital information are combined with bits of a CRC.

In yet another embodiment, the digital information is used to initialize a shift register of a CRC generator prior to CRC generation for data.

In yet another embodiment, the digital information is used to initialize a shift register of a forward error correction (FEC) encoder prior to channel coding for data.

In yet another embodiment, bits of an FEC output are punctured, bits of the digital information are inserted in locations of the punctured bits and a CRC output embedded with the digital information bits is provided. The receiver extracts the digital information from the punctured bit locations of the FEC output.

In yet another embodiment, tail bits of an FEC output are encoded with the digital information rather than being set to a binary value of zero.

In yet another embodiment, the digital information is used to mask an FEC output.

In yet another embodiment, at the transmitter, a transport channel (TrCH) is inputted, a set of transport formats for the input TrCH is determined, the digital information and a least one mapping rule is inputted, a transport format is selected from the transport format set based on the digital information and the at least one mapping rule and the selected transport format is used to transmit the TrCH.

In yet another embodiment, the transmitter sends the digital information during the transmission gaps of the CDMA communication signal when it is in a compressed mode.

In yet another embodiment, the transmitter sends the digital information during a period of an activated discontinuous transmission mode using a predetermined transport format.

The transmitter may embed the digital information in the CDMA communication signal as a watermark in a transmitting (TX) layer 2/3, a TX physical layer, and/or a TX radio frequency (RF) layer.

The receiver may extract the digital information from the CDMA communication signal using a receiving (RX) layer 2/3 processing device, an RX physical layer processing device and/or an RX RF processing device.

BRIEF DESCRIPTION OF THE DRAWINGS

A more detailed understanding of the invention may be had from the following description, given by way of example and to be understood in conjunction with the accompanying drawings wherein:

FIG. 1A shows a traditional digital communication transmitting system;

FIG. 1B shows a watermarking digital communication system configured in accordance with the present invention;

FIG. 11 shows a code-tree for generation of OVSF codes;

FIG. 12 illustrates utilizing channelization code and SF for watermarking in accordance with one embodiment of the present invention;

FIG. 13 illustrates spread data chip sequences with difference gains;

DETAILED DESCRIPTION OF THE PREFERRED EMBODIMENTS

Figure 1C:
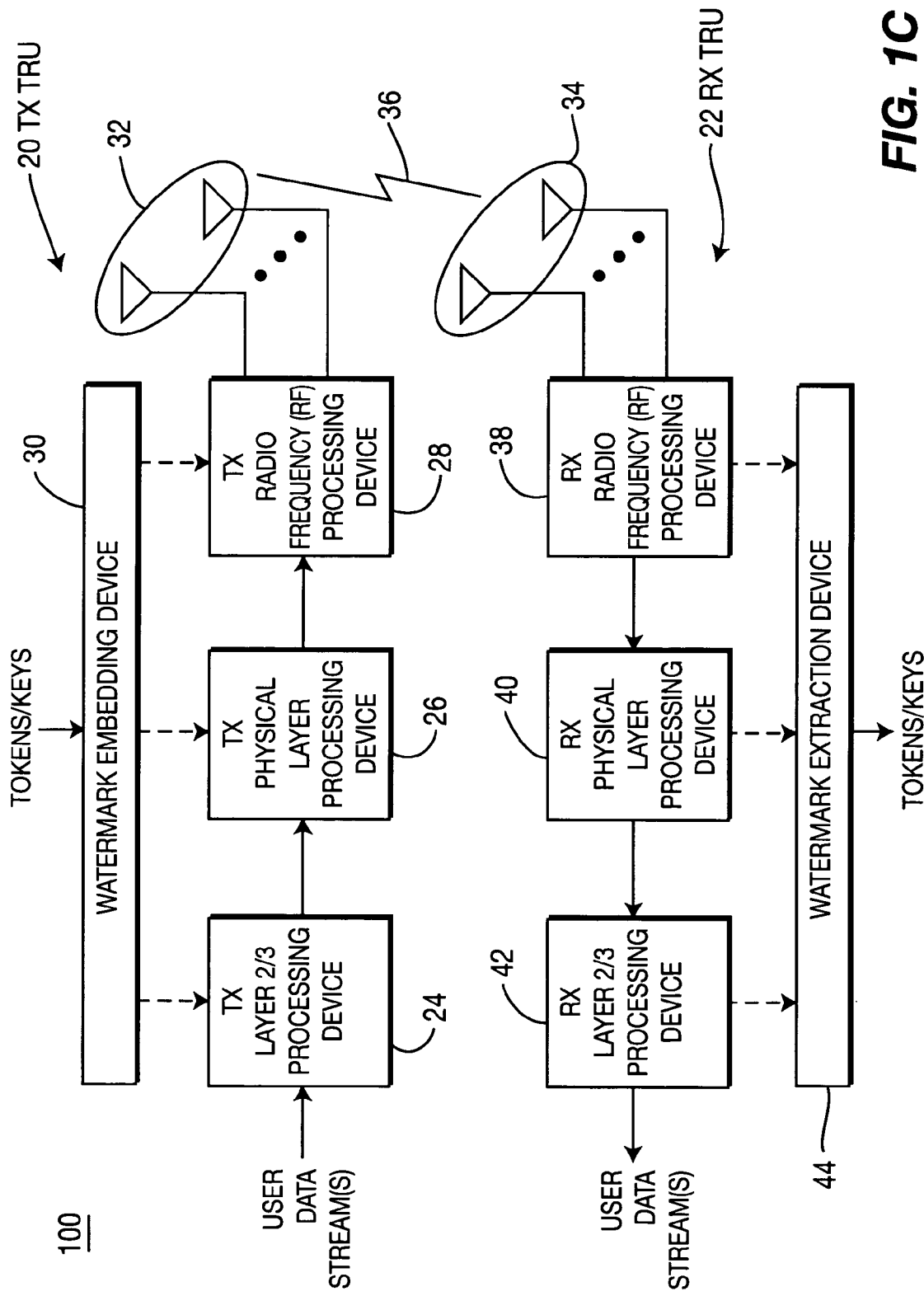
FIG. 1C is an exemplary block diagram of a wireless communication system configured in accordance with the present invention.

The present invention is applicable to communication systems using spread spectrum, (e.g., CDMA, CDMA 2000, time division synchronous CDMA (TDSCDMA)), universal mobile telecommunications system (UMTS) frequency division duplex (FDD)-time division duplex (TDD), orthogonal frequency division multiplexing (OFDM) or the like. However, the present invention is envisioned to be applicable for incorporation into any type of communication system.

The present invention may be implemented in a WTRU or in a base station. The terminology "WTRU" includes but is not limited to user equipment (UE), a mobile station, a fixed or mobile subscriber unit, a pager, or any other type of device capable of operating in a wireless environment. The terminology "TRU" may be any type of wireless communication device (e.g., a WTRU) or any type of non-wireless communication device. The terminology "base station" includes but is not limited to a Node-B, a site controller, an access point or any other type of interfacing device in a wireless environment.

The features of the present invention may be incorporated into an IC or be configured in a circuit comprising a multitude of interconnecting components.

The present invention discloses methods to implement Information Assurance (IA); Authentication (of User, WTRU, and base station), Data Confidentiality, Data Integrity and Network Availability. The present invention discloses IA implemented based on RF watermarking. Embedded physical channels (EPCHs) can be used to transport security related data from higher layers. The EPCHs may include watermarks or signatures (permanent or temporary) associated with users, WTRUs, and/or base stations. Depending upon the security level of the EPCHs, they may be sent in the clear or encrypted by higher layer schemes. The EPCHs may also be used to transport 'challenge-words' for generating session keys, which may be used for encryption or for specifying the structure of EPCHs. The advantage of the embedded channel approach is that it is better suited for long-term continual application, such as periodic authentication etc. Furthermore, the use of EPCHs (as opposed to regular physical channels, for example) allows security operations to be performed in a manner that is transparent to higher layer data or data processing. This implies that higher layer software and applications do not need to be modified. Finally, the operational load of the higher layer processing remains unaffected.

RF watermarks/signatures are powerful concepts that can be used for authentication, data confidentiality as well as data integrity. For example, the RF watermarks/signatures could be used as keys for data encryption and for generating message authentication codes. These keys may be used by themselves or in conjunction with other security keys.

FIG. 1A shows a traditional digital communication system which receives source data $d_{source}$, (e.g., binary data). This data may represent digitized speech or image or video signals or binary text or other digital data. This data is sometimes compressed (through a process called source coding) 76 producing a compressed binary data stream, denoted as $d_{compressed}$. The compressed data $d_{compressed}$ is processed by higher open system interconnection (OSI) layers, (e.g., hyper text transfer protocol (HTTP), transmission control protocol (TCP), Internet protocol (IP) layers, etc.) 78 producing a binary data denoted as $d_{HL}$. The resulting data is now processed by the OSI layers belonging to the Radio Interface, namely Layer 3 80, Layer 2 82, Layer 1 84 and Layer 0 (RF) 86. The resulting data are denoted as $d_4$, $d_3$, $d_2$, $s_1$, and $s_0$, respectively, where $d_4$, $d_3$ and $d_2$ are binary data, and $s_1$ and $s_0$ are analog signals. At the receiver side, the processing is performed similarly, but in a reverse order (Layer 0 (RF) followed by Layer 1, followed by Layer 2, followed by Layer 3, followed by higher layers and then decompressed).

For the following (excluding claims), 'data' and 'signals' refer to 'binary data' and 'analog signals' respectively, unless otherwise noted.

FIG. 1B shows a watermarked digital communication system including a transmitter processing chain for embedding watermarks/signatures into communicated (binary) data and/or (analog) signals. Watermarking involves binary watermark data w, cover data or signal d or s, a watermark embedding scheme/algorithm E and a watermarked data/signal $d_w$ or $s_w$, such as per Equation 1.

$$s_{w=E\{s,w\}} \text{ or } d_{w=E\{d,w\}} \quad \text{Equation (1)}$$

The binary watermark data may be generated by digitizing an analog watermark signal. For example, the finger print or a handwritten signature is an analog signal that can be digitized to produce binary watermark data.

Since embedding allows the watermark to be communicated along with the main source data, the embedding scheme may also be viewed as defining (perhaps implicitly) an Embedded Channel into the source data itself. As such, the embedding scheme may be said to define 'watermarking channels' or 'embedded radio channels'. If these channels are defined at the Layer 1 or Layer 0 (RF), the corresponding embedded radio channels may also be referred to as 'Embedded Physical Channels'.

The watermark/signature may be embedded in content 85 (ws) prior to compression (source coding) 86; embedded in content 87 (wc) after compression (source coding) 86; embedded during higher layer processint 88 (wHL); embedded during Layer 3 89 (w3), Layer 2 90 (w2), Layer 1 91 (w1) and Layer 0 (RF) 92 (w0).

Figure 2:
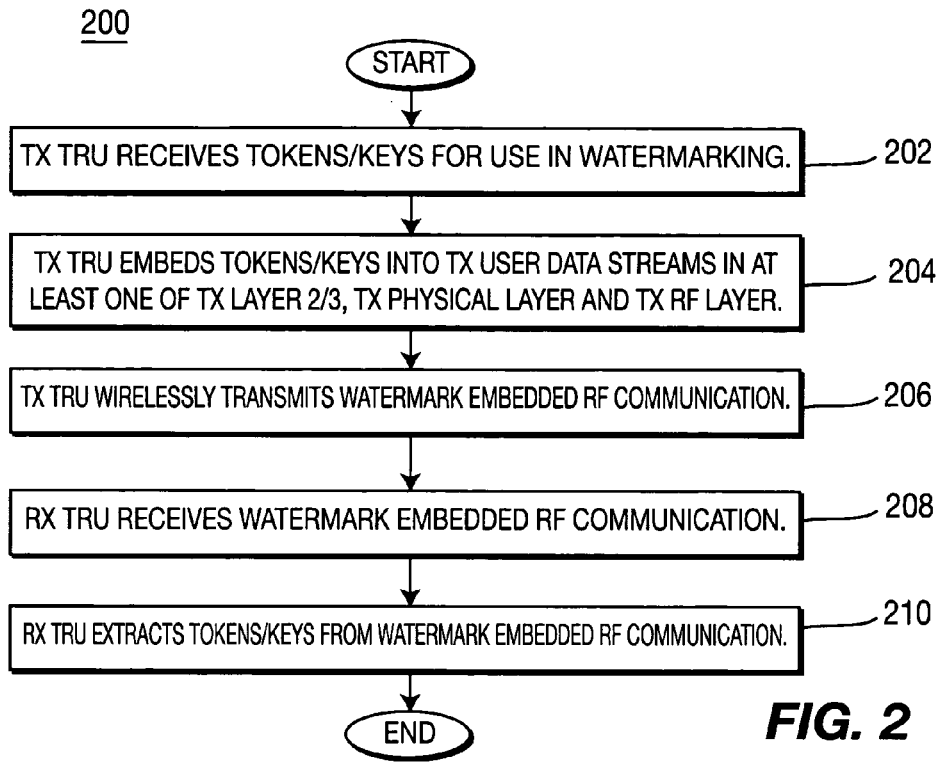
FIG. 2 is a flow diagram of a process including method steps for watermarking wireless communications in accordance with the present invention.

Although the following refers to watermarks, signatures may be used instead of watermarks in the same context for wireless communications. FIG. 1C is an exemplary block diagram of a wireless communication system 100 and is described in conjunction with FIG. 2, which is a flow diagram of a process 200 including method steps for watermarking wireless communications. A transmitting (TX) transmit/receive unit (TRU) 20 transmits user data stream(s) for wireless communication with a receiving (RX) TRU 22. The user data streams are processed using a TX layer 2/3 processing device 24 to perform layer 2/3 (data link/network) processing. Although the layer 2/3 processing is illustrated as occurring in both the TX TRU 20 and the RX TRU 22, it may alternately occur in other communication network nodes. To illustrate, in a UMTS communication system, the layer 2/3 processing may occur within a radio network controller, core network or Node-B.

The layer 2/3 processed data is physical layer processed by a TX physical layer processing device 26. The physical layer processed data is processed for radio transmission by a TX RF processing device 28.

The TX TRU 20 (or alternate network node) receives tokens/keys for producing watermarks (step 202). The tokens/keys are processed by a watermark embedding device 30, which embeds the tokens/keys as a watermark in any one or across multiple ones of the TX layer 2/3, TX physical layer and TX RF layer (step 204). The watermark embedded RF communication is transmitted by an antenna or an antenna array 32 (step 206). The watermark embedded RF communication is received over the wireless interface 36 by an antenna or antenna array 34 of the receiving (RX) TRU 22 (step 208). The received watermark embedded RF communication is RF processed by an RX RF processing device 38. The RF processed communication is physical layer processed by an RX physical layer processing device 40. The physical layer processed communication is layer 2/3 processed by an RX layer 2/3 processing device 42 to produce the user data stream(s). During any one or across multiple ones of the RF layer, physical layer or layer 2/3 processing, the embedded watermark is extracted by a watermark extraction device 44 (step 210), producing tokens/keys such as for use in authentication and other trust, rights, identity, privacy or security purposes.

The various embodiments below describe various techniques for hiding or embedding digital watermarks or signatures at the physical or RF layer of a wireless communication system. It should be understood, however, that any of the following embodiments can be implemented on any layer within the communication system.

To begin, a description is provided of two primary watermarking techniques:
1) hiding watermark information on embedded physical channels; and 2) imprinting watermark information directly into one or more existing physical channels so as to provide information assurance by creating an authenticating signature. In the first primary technique, a new channel is defined to carry a watermark and the watermark channel is then embedded in a physical channel. To illustrate, one technique to produce such a channel is to slowly differentially amplitude modulate physical channel(s) to produce a new watermark channel co-existing with the existing physical channel(s). Watermarks are carried by these channels. This technique can be modeled as follows. The existing physical channel(s) can be viewed as a cover signal s. The watermark is w, an embedding function is E and the embedded physical channel is EPCH. The EPCH creation techniques are described below. The watermarked signal $s_w$ may be expressed according to Equation 2 as follows:

$$s_w = EEPCH\{s,w\}  \qquad \text{Equation (2)}$$

Figure 3:
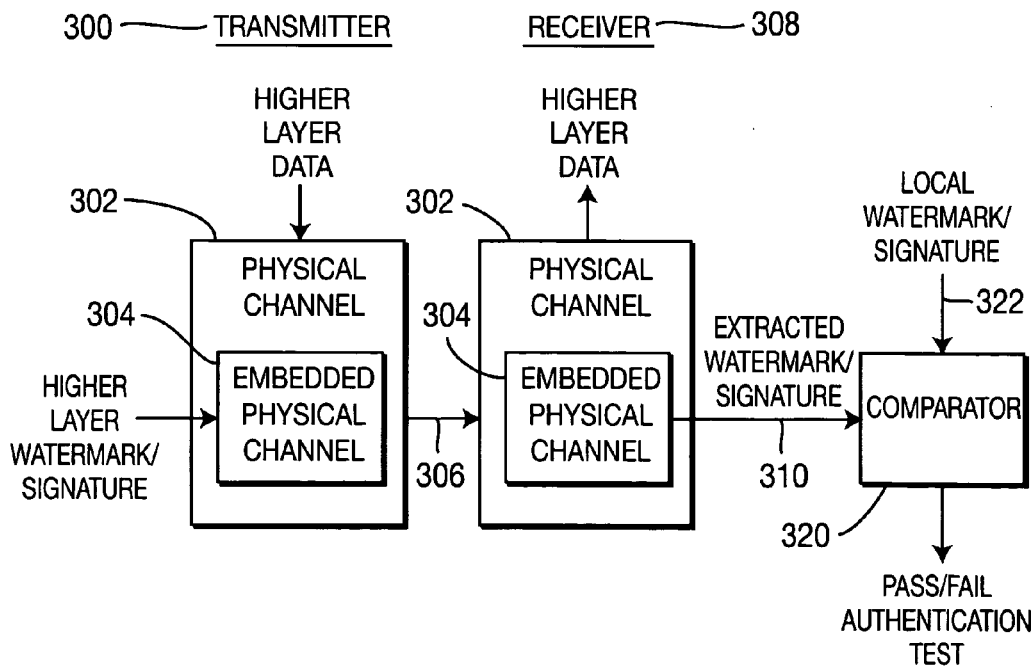
FIG. 3 is a block diagram of a system that creates physical channels in order to transmit and receive watermark/signature information in accordance with the present invention.

The first primary watermarking technique is illustrated in FIG. 3. FIG. 3 is a block diagram of a system, including a transmitter 300 and a receiver 308, for creating physical channels in order to transmit and receive watermark/signature information, (i.e., digital information). Transmitter 300 is shown transmitting higher layer data on physical channel 302. An embedding function creates embedded physical channel 304 in order to transmit watermark/signature information to receiver 308. The embedded physical channel 304 is transmitted under the cover of physical channel 302 to the receiver 308 via a transmission path 306. The receiver 308 extracts the watermark/signature information from the embedded physical channel 304 and compares the extracted watermark/signature information 310 with local (i.e., expected) RF watermark/signature information 322 of the receiver 308 by a comparator 320. If the comparison is positive, transmitter 300 is deemed a trusted data source and the watermark/signature information 306 is processed. Otherwise, the receiver 308 will reject all further data transmissions from the transmitter 300.

To enhance security further, the embedded physical channels may be encrypted to prevent a rogue TRU from being able to copy the watermark, if the rogue TRU is somehow aware of the embedded channel. These embedded channels may be used to carry security related data from higher OSI layers. To illustrate, encryption and other keys from higher layers are carried by the embedded channel. Other data carried on these channels may include "challenge words", so that a TRU can authenticate itself when challenged by another TRU or the network.

The embedded physical channels preferably occur on a long-term continual basis; although non-continuous and short term embedded channels may be used. In some implementations, the watermarking channels operate on their own without data being transmitted on the underlying physical channel(s). As a result, the underlying physical channel(s) may need to be maintained, even when they have no data to transmit. The physical channel can be viewed as a cover work for the watermarking channel. Preferably, the data transmitted on the cover work physical channel is configured so that it seems typical of data transmitted on that channel. The existence of uncharacteristic data on the channel, such as a long run of zeros, may draw an eavesdropper's attention to that channel. Such data preferably mimics data actually sent on the channel, which makes it difficult for the eavesdropper to ascertain when cover data is being transmitted. Alternately, a random bit pattern may be used on the cover channel. For encrypted or scrambled channels, a random bit pattern may provide adequate security for some implementations.

In a military application, for example, the cover data transmitted may be misleading information (misinformation). If an enemy unit encounters the communication node transferring the cover information, the enemy may leave the node intact as to attempt to decode the misleading data or cover data. In one embodiment, the generation of appropriate quality cover data is preferably automated, as manual operations to produce such data may be prone to errors and difficult to implement.

The watermarking channels can be used to increase the bandwidth of the overall communication system. The bandwidth available on the watermarking channel is (in some implementations) in addition to the bandwidth of the underlying physical channel. As a result, the overall bandwidth is increased. To add further security, when multiple watermarking channels are utilized, the watermarking data hops the channels in a predetermined or randomly determined pattern. As a result, an eavesdropper monitoring one channel may only have access to a portion of the watermark data.

The embedded physical channels can be used to allow security operations to be performed in a manner transparent to higher layers. As a result, added security can be achieved without modification to higher layer software and applications and without a change in the operational load of these layers.

In the second primary watermarking technique, the watermark is embedded (imprinted) into the physical channel. To illustrate, synchronization bits or unused bits in a physical channel can be varied to effectively carry the watermark in that physical channel. This technique can be modeled as follows. The existing physical channel(s) can be viewed as a cover signal s. The watermark is w, an embedding function is E and a secret key is k. The secret key k can be viewed as the specific physical channel embedding technique, which is described subsequently. The watermarked signal $s_w$ may be expressed according to Equation 3 as follows:

$$s_w = Ek\{s, w\} \quad \text{Equation (3)}$$

The watermarked signal $s_w$ is preferably robust with respect to common signal processing operations, such as filtering, compression or other typical wireless network functionalities. It is also desirable that the watermarked signal $s_w$ be imperceptible. The use of the watermark does not impact the operation of the wireless system in a perceptible manner. To illustrate, components of the wireless system not aware of the watermark can process the wireless communication without a hardware or software modification. Additionally, if the watermarking technique is publicly known, it is desirable that a form of secure key is used to secure the exchange.

Figure 4:
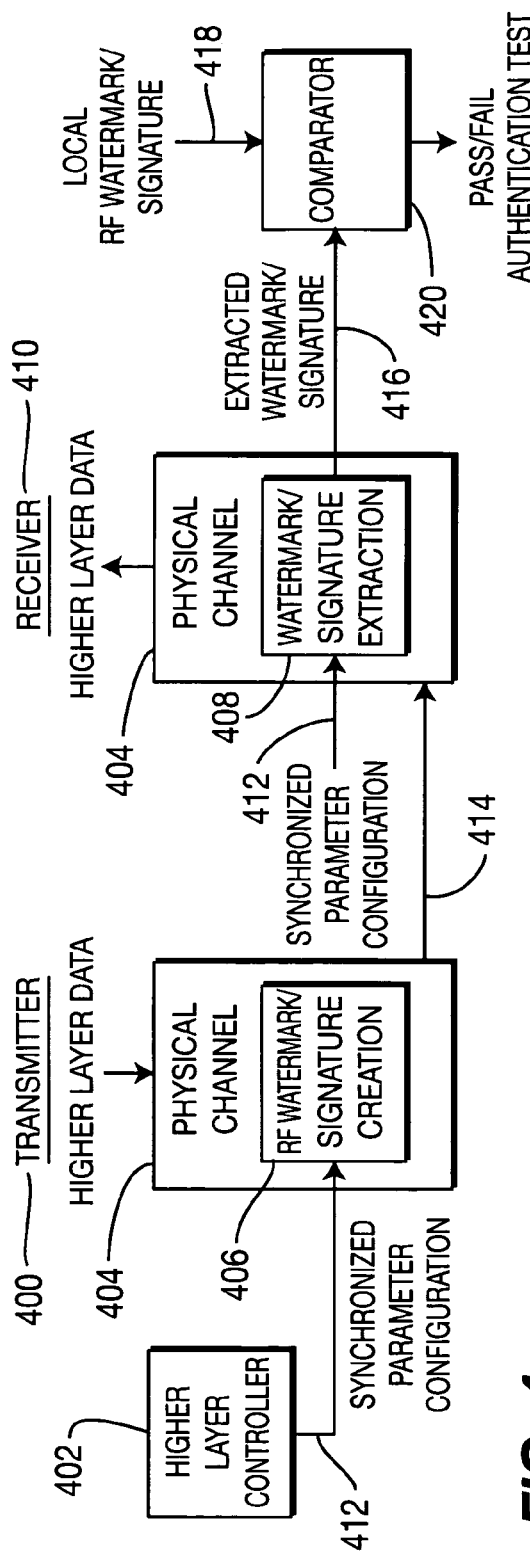
FIG. 4 is a block diagram of a system that performs RF watermark/signature creation and extraction in accordance with the present invention.

This second primary technique is illustrated in FIG. 4. FIG. 4 is a block diagram of a system, including a transmitter 400 and a receiver 410, which performs RF watermark/signature creation and extraction in physical channels, and authenticates received communications to determine if they were originated by a trusted source. FIG. 4 shows a higher layer controller 402 manipulating physical channel 404 with a synchronized parameter configuration 412 so as to perform RF watermark/signature creation 406 in physical channel 404 whereby watermark/signature information (i.e., digital information) is steganographically embedded. This synchronized parameter configuration 412 is known in the receiver 410 and applied to physical channel 404 upon receiving watermark signature information from the transmitter 400 via a transmission path 414 and performing watermark/signature extraction 408 whereby the steganographically embedded watermark/signature information 416 is extracted and compared with local (i.e., expected) RF watermark/signature information 418 of the receiver 410 by a comparator 420. An acceptable comparison authenticates the transmitter 400 as being a trusted data source by performing a pass/fail authentication test.

Below is a description of various types of CDMA watermarking techniques. SS systems refer to any radio air interface systems using SS techniques, including UMTS FDD/TDD and CDMA2000. Different candidate watermarking solutions for SS systems described below may be implemented in various system layers.

CRC or Parity Bit Failure

Figure 5:
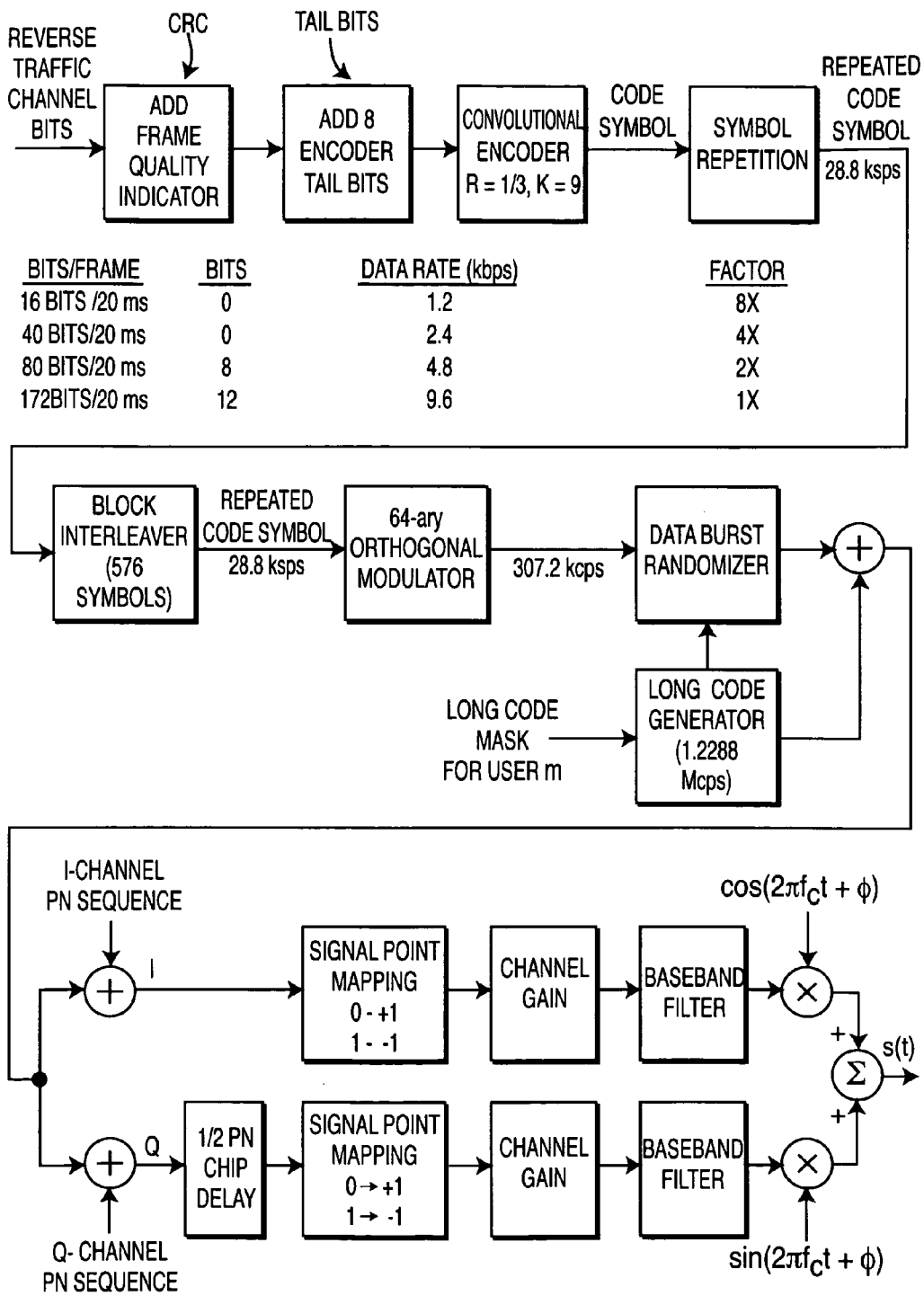
FIG. 5 illustrates that watermarks may be incorporated into a CRC and tail bits of a CDMA reverse fundamental channel in accordance with the present invention in accordance with the present invention.

FIG. 5 illustrates that watermarks may be incorporated into a CRC and tail bits of a CDMA reverse fundamental channel in accordance with the present invention. An alternate embodiment proposes to intentionally corrupt, at some predetermined interval, the cyclic redundancy check (CRC) or a parity bit. CRCs and parity checks are used to protect packetized data transmissions from bit errors due to noise, interference, collisions, and multi-path in a given RF channel. By corrupting these checks periodically or a predetermined time, a receiver will receive transmission errors at some corresponding rate. If the error rate is as expected, a receiver can authenticate the source of the transmission. The absence of errors or receiving errors at some unexpected rate alerts a receiver that perhaps the transmitter is not a desired data source.

Figure 6:
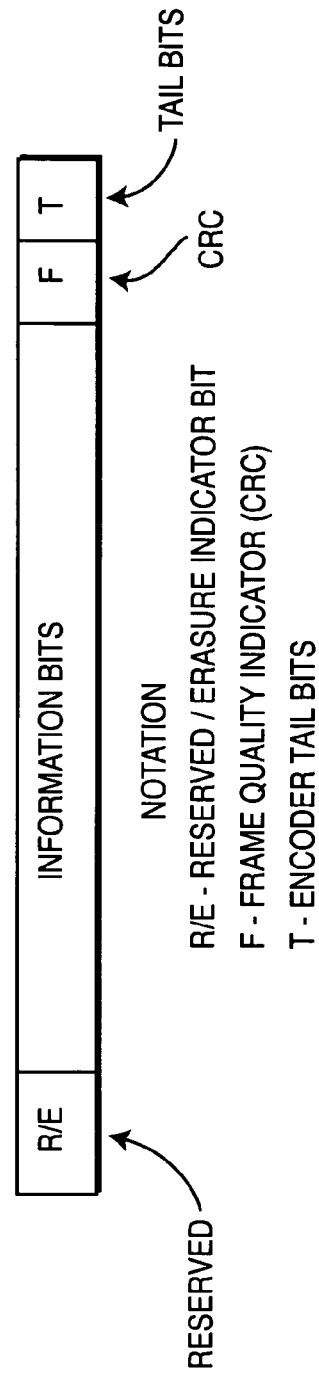
FIG. 6 illustrates the frame structure of the CDMA reverse fundamental channel of FIG. 5.

FIG. 6 illustrates the frame structure of the CDMA reverse fundamental channel of FIG. 5. The frame structure includes a reserved/erasure (R/E) indicator bit, information bits, a frame quality indicator (F), such as a CRC, and encoder tail bits T. The frame quality indicator (F) is calculated on all bits within the frame, except the frame quality indicator itself and the encoder tail bits (T). The last eight bits of the encoder tail bits (T) are each typically set to zero.

Figure 7:
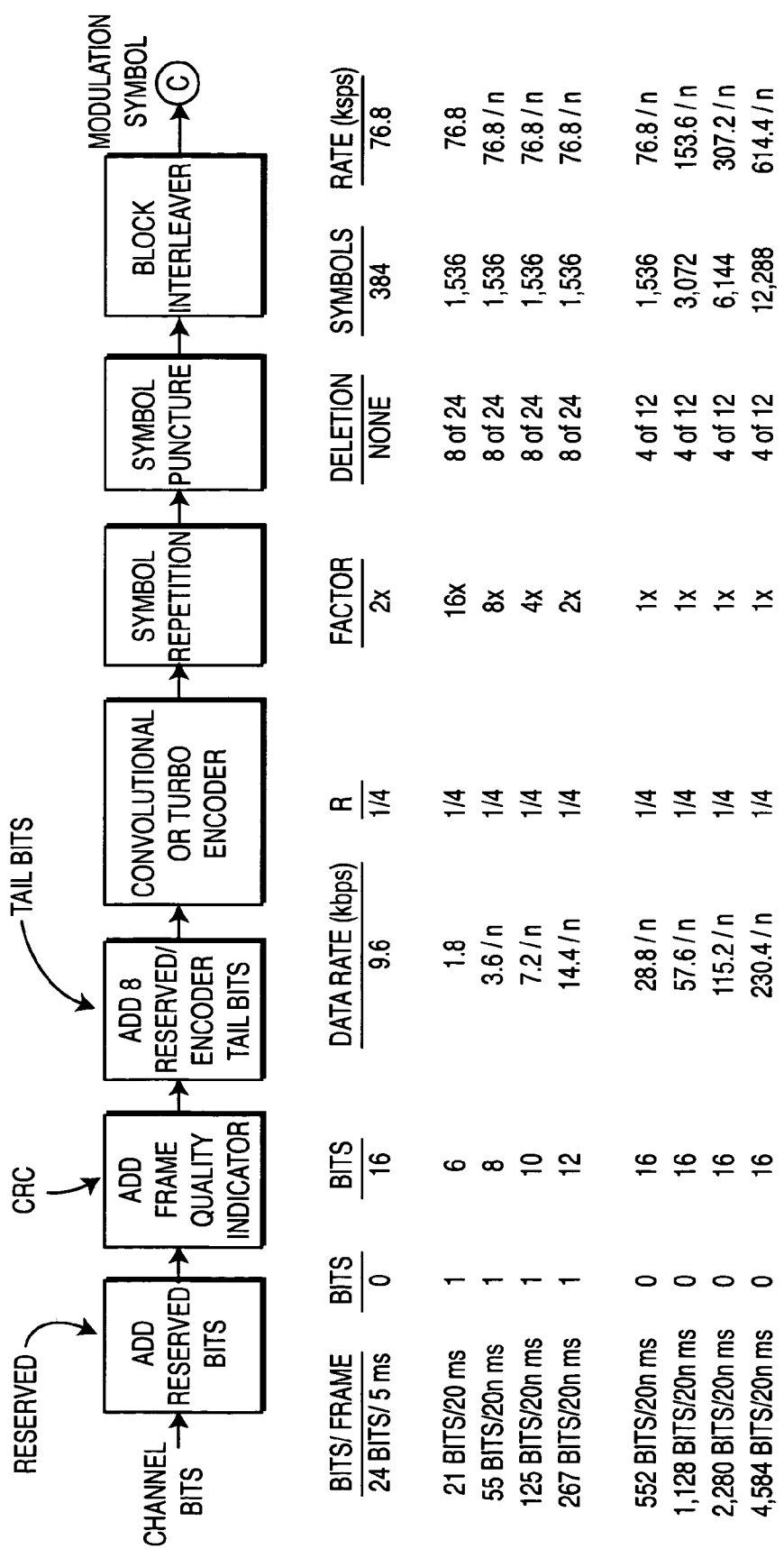
FIG. 7 illustrates a CDMA reverse fundamental channel and reverse supplemental channel structure in which watermarks may be incorporated into reserved bits, CRC and tail bits of the structure in accordance with the present invention.

FIG. 7 illustrates a CDMA reverse fundamental channel and reverse supplemental channel structure in which watermarks may be incorporated into reserved bits, CRC and tail bits of the structure. The value of n is the length of the frame in multiples of 20 ms. For 37 to 72 encoder input bits per frame, n=1 or 2. For more than 72 encoder input bits per frame, n=1, 2 or 4.

FSK Modulation Based Watermarking with Scrambling Code Jitter

Figure 8:
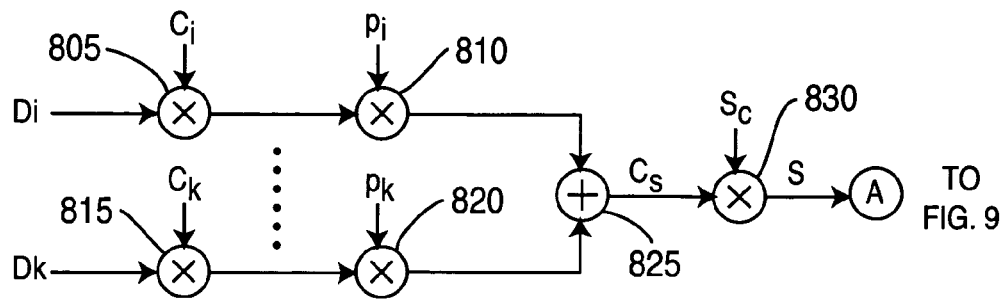
FIG. 8 shows a spreader for spreading CDMA data channels in accordance with one embodiment of the present invention.

In SS systems, scrambling codes are used to separate terminals or base stations from each other. In one embodiment of the present invention, FIG. 8 shows a spreader 800 for spreading CDMA data channels. The scrambling code, SC, is applied and aligned with the radio frames, such that the first scrambling chip corresponds to the beginning of a radio frame. For watermarking, we apply slow scrambling code jitter with respect to the carrier frequency and FSK modulation of watermark information on top of this jitter by placing a low frequency drift on the carrier frequency, (i.e., by gradually incrementing the frequency, either in an upwards or downwards direction, in small frequency steps). Thus, the watermark information is hidden.

In the spreader 800 of FIG. 8, an i-th data stream $D_i$ is spread to chip rate by an associated channelization code $C_i$ through a multiplier 805. The spread signal is then weighted by a gain factor, $p_i$, through a multiplier 810. In addition, a k-th data stream $D_k$ is spread to chip rate by an associated channelization code $C_k$ through a multiplier 815. The spread signal is then weighted by a gain factor, $p_k$, through a multiplier 820. The weighted spread signals are summed via an adder 825 to provide a summed chip sequence signal $C_s$, which is then scrambled by the scrambling code $S_c$ through a multiplier 830, to provide a complex-valued chip sequence S.

It should be noted that the physical layer parameters including the channelization code, gain factor, and scrambling code, are used and/or modified to carry/represent watermark information in the present invention, as mentioned later.

Figure 9:
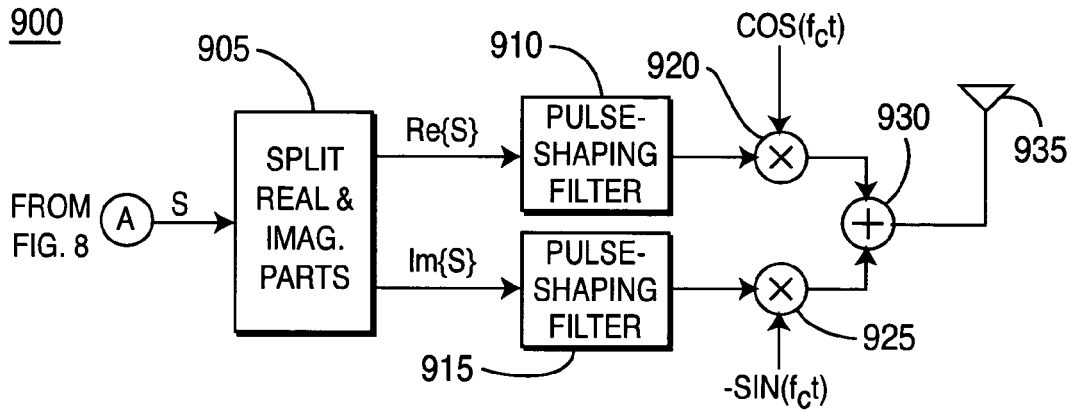
FIG. 9 shows a modulator for modulating signals received from the spreader of FIG. 8 in accordance with one embodiment of the present invention.

FIG. 9 shows a modulator 900 for modulating the complex-valued chip sequence S generated by the spreader 800 of FIG. 8. A spreading sequence and a carrier frequency are modulated. The complex-valued chip sequence S is split into real and imaginary parts by a splitter 905. The real and imaginary parts, Re{S} and Im{S}, respectively, are then processed by the pulse shaping filters, 910 and 915, respectively, to meet the required spectrum regulation. The pulse-shaped chip sequences output by the filters 910 and 915 are modulated by the carrier frequency $f_c$ via multipliers 920 and 925, respectively using cosine and sine signals, respectively, having a carrier frequency of $f_c$ as a function of time t (i.e., radius/sec). Finally, the carrier modulated signals are summed by a summer 930, before being transmitted by an antenna or antenna array 935. As will be discussed below in more detail, the carrier frequency $f_c$ is used to carry watermark information by adding or subtracting a frequency offset based on the watermark information.

Figure 10:
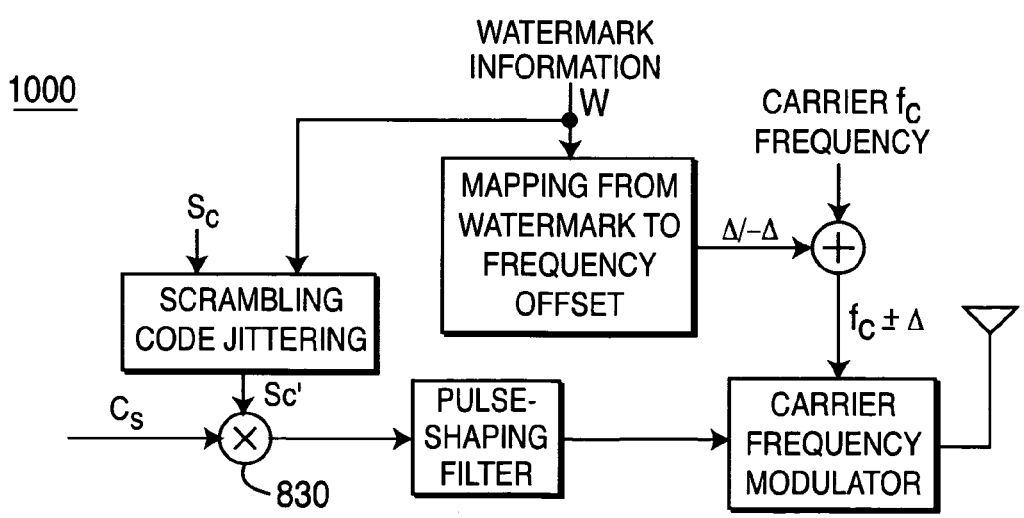
FIG. 10 illustrates an FSK modulation-based watermarking system using scrambling code jitter in accordance with one embodiment of the present invention.

FIG. 10 illustrates an FSK modulation-based watermarking system 1000 using with scrambling code jitter. The watermark information W is mapped to a predefined frequency offset $\Delta$. When jitter of the scrambling code $S_c$ occurs, thus forming scrambling code jitter $S_c'$, a local descrambler in the receiver has to be synchronized to generate the same descrambling code jitter. The watermark information W may be represented in the amount of the scrambling code jittering $S_c'$ and frequency offset $\Delta$, separately. In a simplified example, a single watermark bit is embedded in the carrier frequency $f_c$ and/or scrambling code $S_c$. In this case, a watermark bit, "Zero", may lead the scrambling code, $S_c$, to jittering late by a predefined amount in chips to generate the jitter scrambling code $S_c'$, while a watermark bit, "One", may lead the scrambling code to jitter early by the same amount. Similarly, the "Zero" watermark bit is represented as a negative predefined frequency offset, $-\Delta$, while the "Zero" watermark bit is represented a positive predefined frequency offset, $+\Delta$. The original carrier frequency $f_c$ is then biased by the frequency offset, $f_c \pm \Delta$, depending on the binary watermarking bit.

Stealing Scrambling Code and/or Channelization Code Chips for Watermarking

In this case, we select certain chips in the scrambling code (and/or channelization code) of FIG. 8 and embed watermark information on these chips such that no change occurs if a stolen code chip is "0", and a flip occurs if a stolen code chip is "1" (i.e., change the stolen code chip from "1" to "0"). In this case, the selected chip locations are known at both transmitter and receiver. The locations may be changed slowly. With heavy channel coding this will make the information readable at the receiver. From the point of view of the uninformed, however, this will cause some signal-to-noise ratio (SNR) degradation, but the effect should be small, particularly if the SF is large. Alternatively, the watermark chip may be always set to "1" or "0" to indicate that the transmitter that sets it can be trusted.

Utilizing (Physical Channel) Configuration of Channelization Code and SF for Watermarking In typical CDMA systems, the channelization codes of FIG. 8 are OVSF codes that preserve the orthogonality between a user's different physical channels. The OVSF codes can be defined using the code tree of FIG. 11. For a given data sequence to be sent, there are several possible configurations of channelization code and SF. For example, using 2 channelization codes with SF=32 is equivalent to using 1 channelization code with SF=64 in terms of the number of physical channel bits. In this case, the configuration of using 2 channelization codes with SF=32 may be used to represent one bit of the watermark information, while the configuration of using 1 channelization code with SF=16 may represent a zero bit. As a result, the watermark information can be mapped, in a subscriber unit, to the physical channel combinations according to a predefined rule established by a base station.

FIG. 12 depicts a watermarking scheme utilizing channelization code and SF. It is simply assumed that all the OVSF channelization codes in the OVSF tree of FIG. 11 are available to transmit a user data stream. In addition, it is assumed that for transmitting a given user data, we have two channelization code configuration options: referring to FIG. 11, the first is to use $\{C_{ch,2,o}, C_{ch,2,1}\}$ each having SF=2 and the other $\{C_{ch,4,o}, C_{ch,4,1}, C_{ch,4,2}, C_{ch,4,3}\}$ each having SF=4. It is also assumed to signal a single watermark bit. In this case, we define the mapping rule as follows: the "Zero" watermark bit is associated with the first option, $\{C_{ch,2,o}, C_{ch,2,1}\}$ each having SF=2, while the "One" watermark bit is associated with the second $\{C_{ch,4,o}, C_{ch,4,1}, C_{ch,4,2}, C_{ch,4,3}\}$ each having SF=4. As a consequence, for a given input single bit watermark information W, the mapping function 1200 selects which channelization code configuration option is used for transmitting the user data. The selected channelization codes are provided for the spreader of FIG. 8. At the receiver, it is estimated/determined which channelization code configuration is used for the data transmission. The watermark information is extracted according to the estimation, assuming that the receiver knows the mapping rule a priori.

Utilizing Power (Gain) Ratios (or Differences) Between Channelization Codes for Watermarking FIG. 13 illustrates an example of the two spread and weighed data signals with the channelization codes $C_i$ and $C_k$ and gain factors, $p_i$ and $p_k$. When multiple channelization codes are used for a given communication link, assuming to allow their transmit power to be separately adjustable subject to a given total power, watermark information may be represented as a relative gain (or power) offset between any pair of the multi-channelization codes, i.e., $\{C_i, C_k\}$ having respective gains (or power) $P_i$, $P_k$. The power in channelization codes an be alternated from frame-to-frame to create a signature. Furthermore, when two channelization codes are simultaneously used by the same subscriber unit, watermark information can be encoded on the alternating pattern of which code is higher/lower during this frame.

Figure 14:
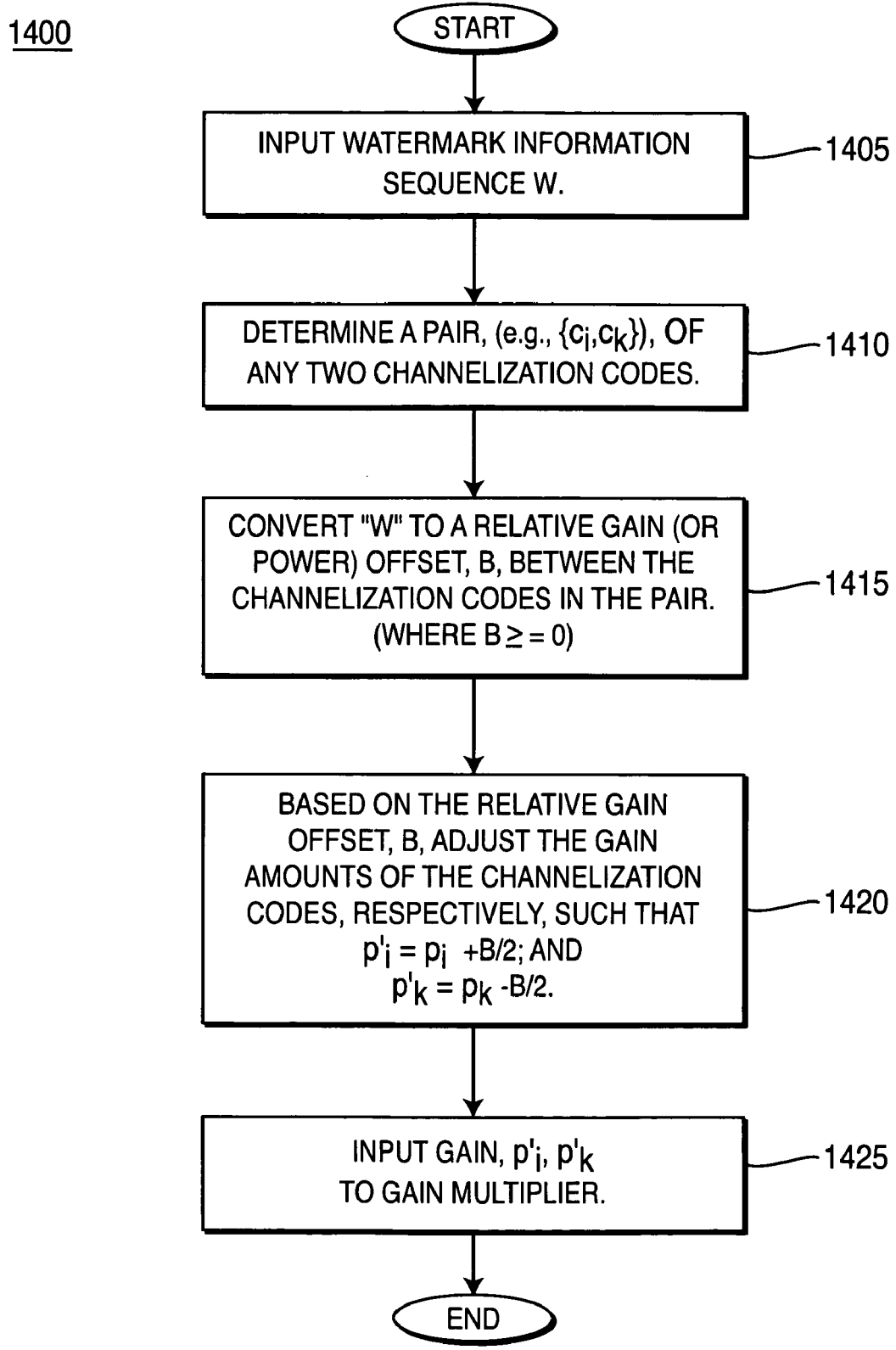
FIG. 14 is a flow diagram of a process including method steps for utilizing a gain offset between a pair of channelization codes for watermarking in accordance with one embodiment of the present invention.

FIG. 14 is a flow diagram of a process 1400 including method steps for utilizing a gain offset between a pair of channelization codes for watermarking. Here, the gain of a channelization code means the gain of the CDMA data carried in the channelization code. In addition, we assume that the gain is calculated from a transmit power control algorithm. The watermarking based gain offset, B, is then applied on top of the calculated gain, if necessary. Multiple relative gain offsets may be used among different pairs of multiple channelization codes.

In step 1405, watermark information sequence w is input to a conversion block converting/mapping "w" to "B". In step 1410, a pair of channelization codes $\{C_i, C_k\}$ is determined. In step 1415, w is converted to a relative gain (or power) offset, B, between the pair of channelization codes, where $B \geq 0$, according to a predefined conversion/mapping table which is know at both the transmitter and receiver. In step 1420, based on the relative gain offset, B, adjust the gain amounts of the channelization codes, respectively, such that $p_i'=p_i+B/2$; and $P_k'=P_k-B/2$. In step 1425, the gains $p_i'$ and $p_k'$ are input to a gain multiplier (i.e., the multipliers 810 and 820 in the spreader 800 of FIG. 8).

Delay Modulation Based Watermarking

The principle of this idea is similar to the above (utilizing gain offsets of channelization codes for watermarking). But, for this case watermark information is mapped as a delay of a channelization code transmission where the delay is a time relative to reference channel transmission timing or a physical channel frame boundary. In the case of multi-code transmissions, the individual delays of each channelization code may be jointly used for watermark transmission. Higher layers may get involved in determining the individual delay(s). When delay-transmit diversity is employed, the relative delays among antennas may be used to represent watermark information.

Stealing Pilot/Control/Data Symbols for Watermarking

Watermarks are embedded into pilot channel or control channel or data channel or combination channels in a predefined manner (predefined symbol positions) such that we pick certain pilot symbols in the pilot channel and embed watermark information on these (i.e., keep as is if 0, flip if 1).

STBC Transmit Diversity

Figure 15A:
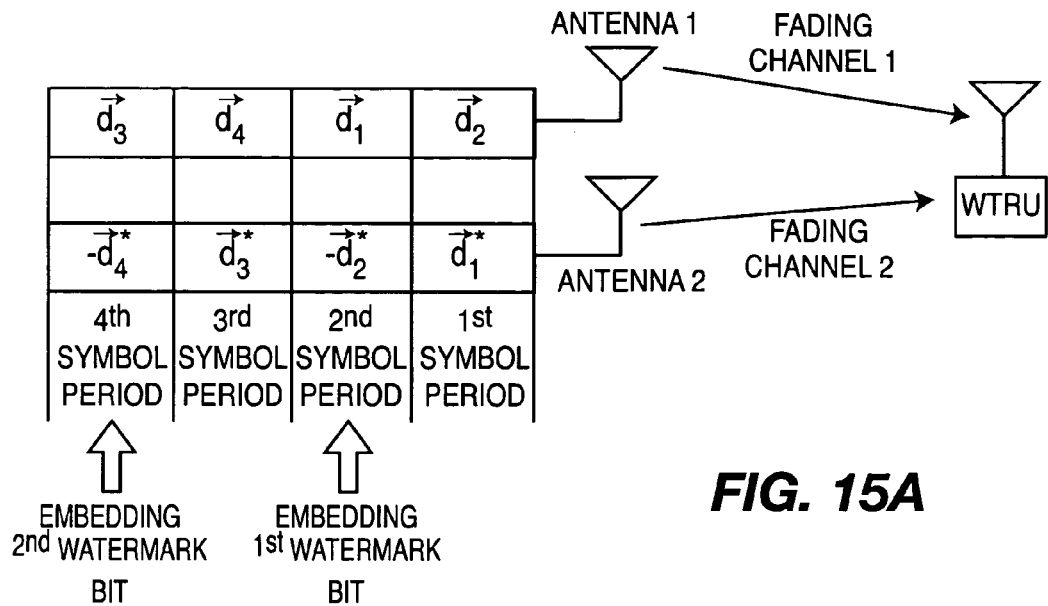
FIG. 15A illustrates a space-time block coding (STBC) encoder structure in accordance with one embodiment of the present invention.

Referring to FIGS. 1 and 15A, assuming that the TX TRU transmitter 20 shown in FIG. 1 has four complex-valued data symbols, $\{\vec{d}_1, \vec{d}_2, \vec{d}_3, \vec{d}_4\}$, from a higher layer, one known STBC transmit diversity technique constructs the space-time codewords by simultaneously transmitting two different data symbols $\vec{d}_2$ and $\vec{d}_1^*$ from antenna 1 and diversity antenna 2, respectively, as shown in FIG. 15A, during the first symbol period, where "*" denotes the conjugate operator of a complex scalar or vector. Then, symbols $\vec{d}_1$ and $-\vec{d}_2^*$ are sent from antennas 1 and 2, respectively, in the second symbol period. Similarly, in the third symbol period, $\vec{d}_4$ and $\vec{d}_3^*$ are transmitted from antennas 1 and 2, respectively, while symbols $\vec{d}_3$ and $-\vec{d}_4^*$ are sent from antennas 1 and 2, respectively, in the fourth symbol period. In this case, two watermark bits may be embedded into the symbols, every other symbol period. For example, if the first watermark bit is equal to "0", then flip the symbols in the second symbol period, such as from ($\vec{d}_1$ and $-\vec{d}_2^*$) to ($-\vec{d}_1$ and $\vec{d}_2^*$). Otherwise, if the first watermark bit is equal to "1", the symbols are kept as they are. Similarly, if the second watermark bit is equal to "0", then flip the symbols in the fourth symbol period such as from ($\vec{d}_3$ and $-\vec{d}_4^*$) to ($-\vec{d}_3$ and $\vec{d}_4^*$). Otherwise, the two symbols in the fourth symbol period remain the same.

SFBC Transmit Diversity

Figure 15B:
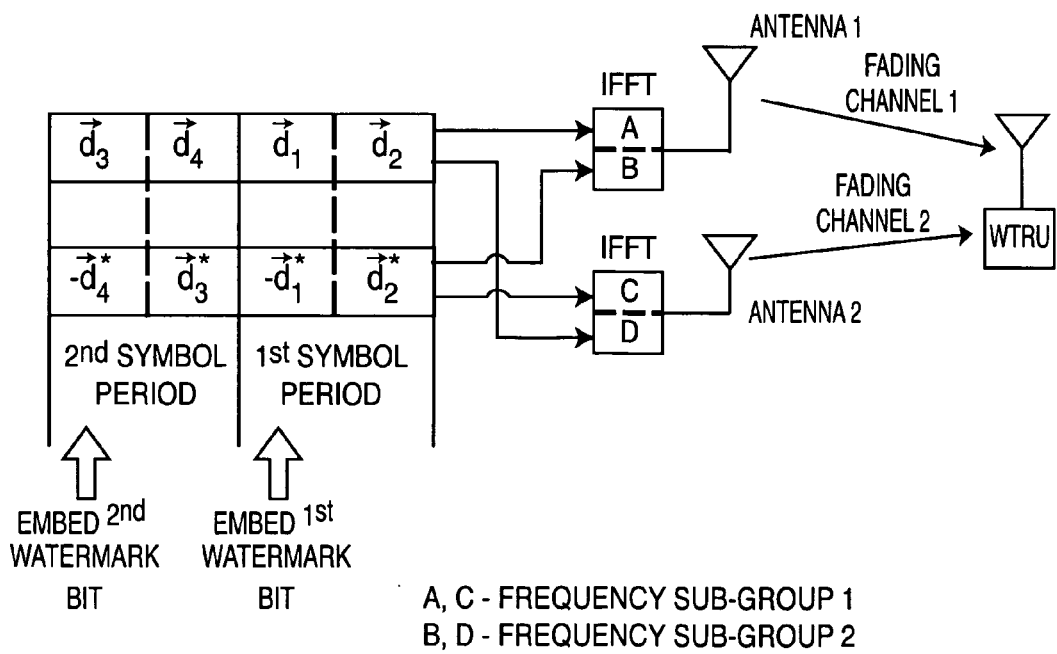
FIG. 15B illustrates a space-frequency block coding (SFBC) encoder structure in accordance with one embodiment of the present invention.

A similar watermarking process can be implemented in an SFBC encoder structure, as shown in FIG. 15B. This transmit diversity techniques constructs a space-frequency codeword by simultaneously transmitting two different data symbols $\vec{d}_2$ and $\vec{d}_1^*$ from frequency sub-group 1 and diversity frequency sub-group 2, respectively, as shown in FIG. 15B, during a first symbol period, where "*" denotes the conjugate operator of a complex scalar or vector. Then symbols $\vec{d}_1$ and $-\vec{d}_2^*$ are sent from frequency sub-groups 1 and 2, respectively, in the second symbol period. Similarly, in the third symbol period, $\vec{d}_4$ and $\vec{d}_3^*$ are transmitted from frequency sub-groups 1 and 2, respectively, while symbols $\vec{d}_3$ and $-\vec{d}_4^*$ are sent from frequency sub-group 1 and diversity frequency sub-group 2, respectively, in the fourth symbol period. In the present embodiment, two watermark bits may be embedded into the symbols, every other symbol period, as follows: if the first watermark bit is equal to "zero", symbols in the second symbol period are flipped such as from ($\vec{d}_1$ and $-\vec{d}_2^*$) to ($-\vec{d}_1$ and $\vec{d}_2^*$). Otherwise, if the first watermark bit is "one", the symbols are kept as they are. Similarly, if the second watermark bit is equal to "zero", then symbols in the fourth symbol period are flipped such as from ($\vec{d}_3$ and $-\vec{d}_4^*$) to ($-\vec{d}_3$ and $\vec{d}_4^*$). Otherwise, the two symbols in the fourth symbol period remain same as they are.

Introducing/Defining a New Physical Channel or Watermark Field for Watermarking

Watermark information can be directly transported by defining a new physical channel or watermark field (similar to a control signaling (TFCI or TPC) field).

DPC Based Watermarking

Dirty paper coding (DPC) is a coding technique using side information which will be transmitted along with the encoded information, as described by Cox et al. in the IEEE article "Watermarking as Communications with Side Information." Imagine a sheet of paper covered with a Gaussian distributed pattern of "dirt". This dirt is a noise or interference source (side information above), which the transmitter can examine. The transmitter writes a message on this paper and sends it to a receiver. Costa describes, in an IEEE article entitled "Writing on Dirty Paper", theoretically showed that the noise/interference source (that is, dirty paper) has no effect on the information capacity. In accordance with the present invention, watermark information is regarded as the DPC encoded information, and any other CDMA signals (dedicated channel or control channel) are regarded as the noise/interference source (side information).

Figure 16A:
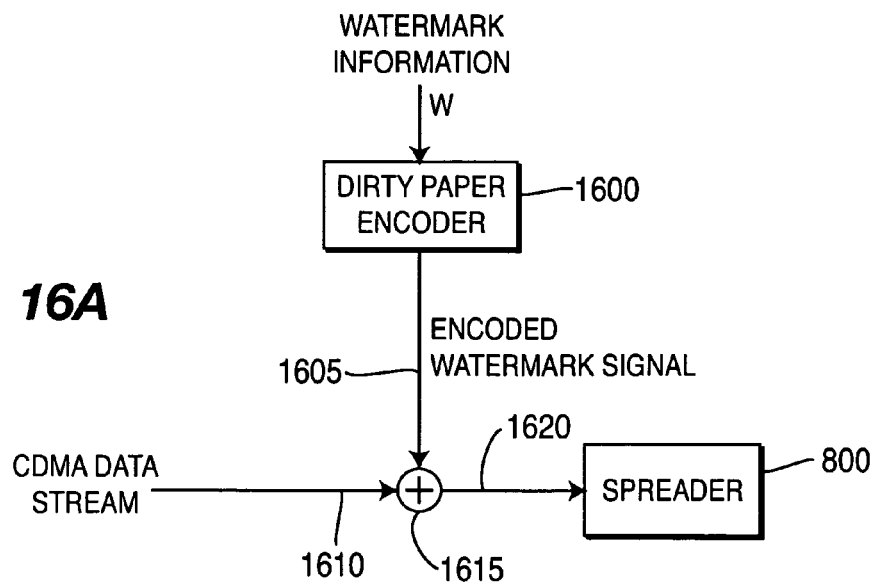
FIG. 16A illustrates an exemplary dirty paper coding (DPC) system using a simple adder (or modular summer)
Figure 16B:
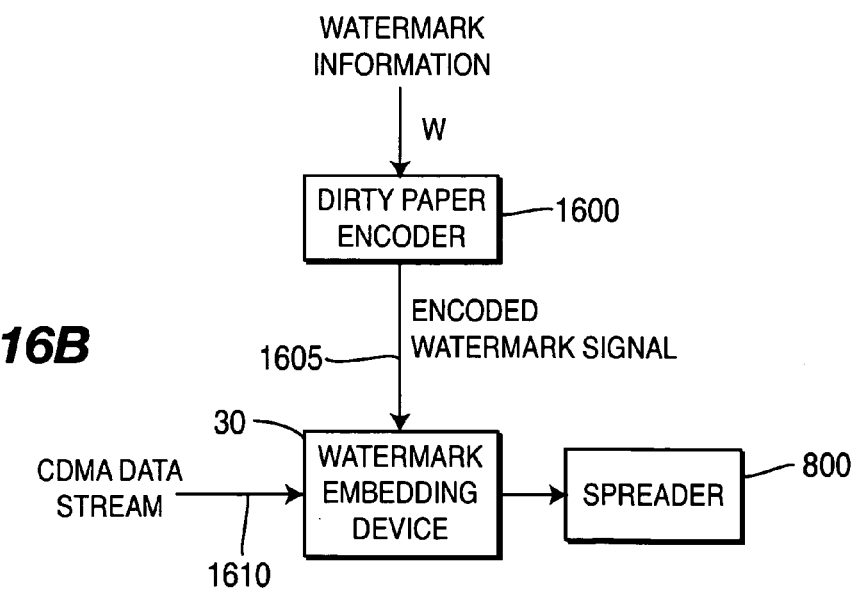
FIG. 16B illustrates an exemplary dirty paper coding (DPC) system using a watermarking embedding device in accordance with one embodiment of the present invention.

FIGS. 16A and 16B show two examples of DPC based watermarking systems. In FIG. 16A, watermark information, w, is encoded (or pre-coded) through a DPC encoder 1600. An encoded watermark sequence 1605 is then added (or modularly summed) by an adder 1615 with the CDMA data stream 1610. The resulting signal 1620 goes to the spreader 800 (as shown in FIG. 8). In FIG. 16B, a watermark embedding device 30 (also shown in the system 100 of FIG. 1) is used instead of the simple adder (or modular summer) 1615 as shown in FIG. 16A. The watermark embedding device 30 is used to tailor the encoded watermark signal according to the CDMA data stream 1610 in an attempt to attain an optimal trade-off between estimates of perceptual fidelity and robustness where the perceptual fidelity and robustness are typical requirements for watermarking. DPC processing may be performed on a chip level at the spreader 800.

Watermark Embedded CRC

Figure 17:
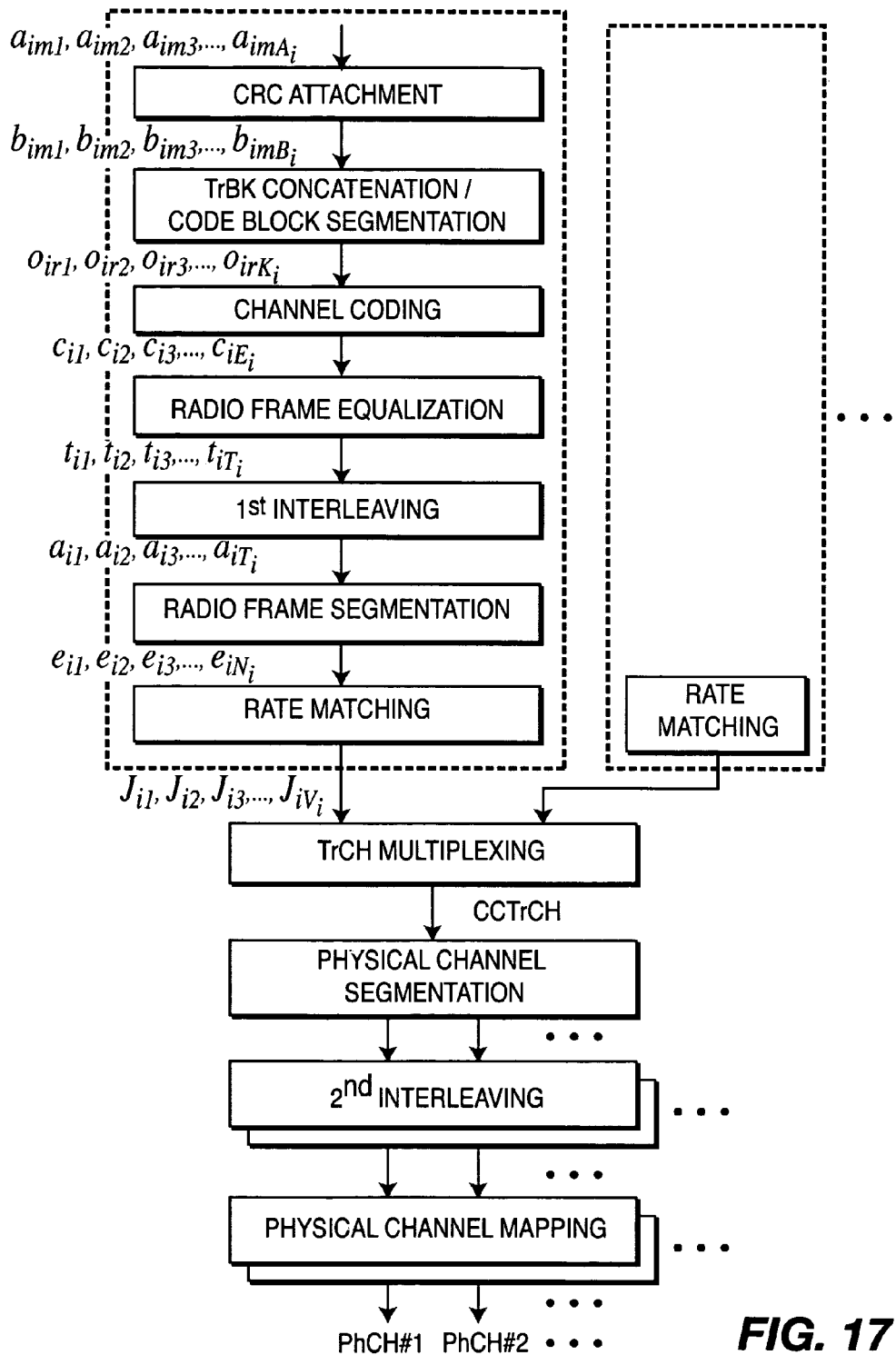
FIG. 17 illustrates transport channel multiplexing structure for 3GPP uplink in accordance with one embodiment of the present invention.
Figure 18:
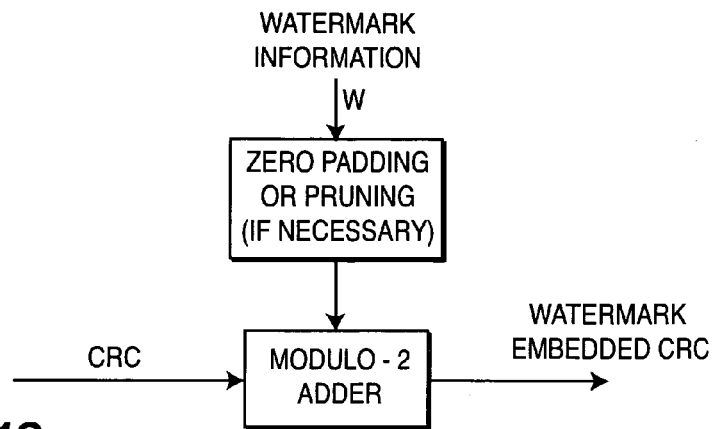
FIG. 18 illustrates CRC based watermarking in accordance with one embodiment of the present invention.

Error detection is provided on transport blocks through a CRC. The 3GPP TS 25.212 entitled "Multiplexing and channel coding (FDD)" discloses that the size of the CRC is 24, 16, 12, 8 or 0 bits and it is signaled from higher layers what CRC size that should be used for each transport channel. The entire transport block is used to calculate the CRC parity bits for each transport block. The parity bits are generated by one of the following cyclic generator polynomials:

$-g_{CRC24}(D)=D^{24}+D^{23}+D^6+D^5+D+1;$ $-g_{CRC16}(D)=D^{16}+D^{12}+D^5+1;$ $-g_{CRC12}(D)=D^{12}+D^{11}+D3+D^2+D+1;$ and $-g_{CRC8}(D)=D8+D^7+D^4+D^3+D+1.$ FIG. 17 illustrates transport channel multiplexing structure for 3GPP uplink, showing where the CRC attachment is applied. Watermark information can be embedded in cyclic redundancy code in various ways. As shown in FIG. 18, a modulo-2 adder may be used to combine CRC bits with watermark bits where the CRC bits are generated based on (dedicated or control) data. If the length of watermark bits is not the same as the CRC length, then zero-bit padding or pruning may be used for the modulo-2 add operation. Alternatively, the shift register of the CRC generator may be initialized by one or more watermark bits prior to CRC generation for data.

Watermark Based FEC Initialization

Figure 19A:
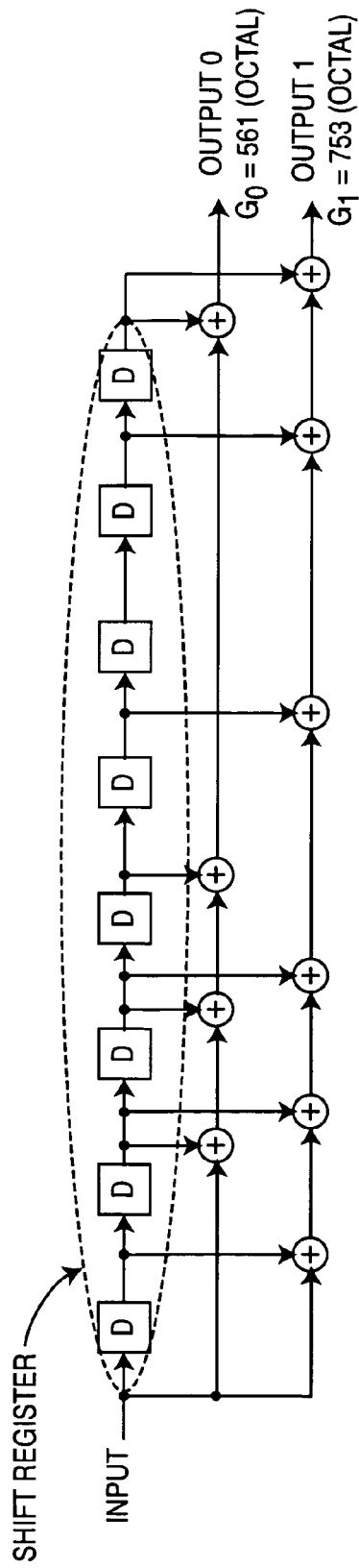
FIG. 19A shows a rate 1/2 convolutional coder.
Figure 19B:
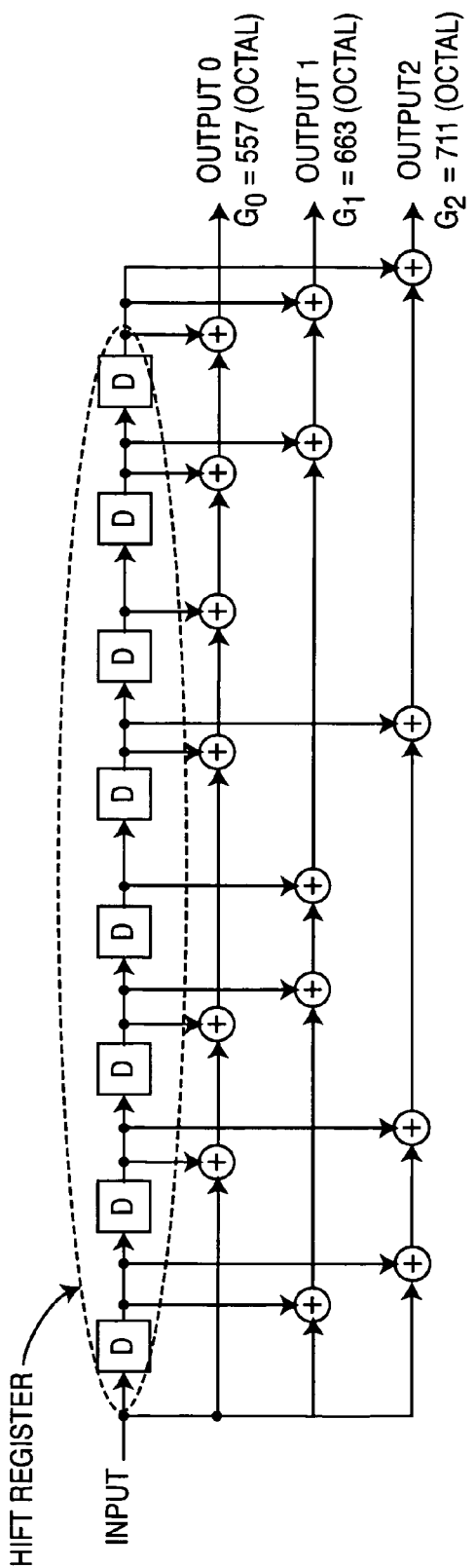
FIG. 19B shows a rate 1/3 convolutional coder.

In FIGS. 19A and 19B, rate 1/2 and rate 1/3 convolutional encoders used in 3GPP are shown. Typically, the initial values of the shift register of the coder shall be "all 0s" when starting to encode the input bits. Watermark information is used to initialize the shift register of the FEC encoder prior to channel coding for data.

FEC Redundant Bits Replacement for Watermarking

Figure 20:
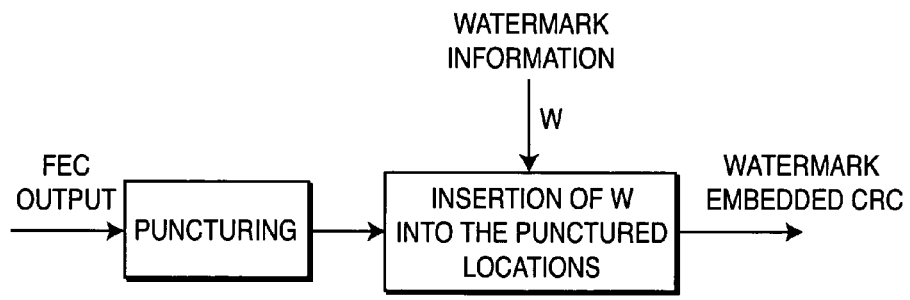
FIG. 20 illustrates FEC redundant bits replacement for watermarking in accordance with one embodiment of the present invention.

Some of the redundant bits of FEC output are replaced with watermark bits using puncturing, where watermark information w is inserted into the punctured locations known by the sender and receiver to provide a watermark embedded CRC output, as shown in FIG. 20.

FEC Tail Bit Modification

In convolutional type FEC, tail bits are appended after the encoded data sequence, in order to return the convolution encoder to a "zero state". For the convolutional encoder structures shown in FIGS. 19A and 19B, 8 tail bits with binary value 0 shall be added to the end of the coded block before encoding. The tail bits are encoded with watermarking information, rather than being set to all zeros.

Tail bits are inserted into a header in order to facilitate a reliable and timely detection of the data packet's Rate and Length fields. The header tail bits or the convolutional tail bits (or both) may be modified so as to encode them with watermark information. As an example, specific, predetermined tail bits can be flipped from zeros to ones in a predetermined pattern to form an embedded physical channel wherein the tail bit pattern represents a bit or bits of data.

Alternatively, either set of tail bits can be manipulated so as to generate an authorization signature. As long as both the transmitter and receiver know what known state the decoder wants to achieve, these tail bits can be manipulated without affecting the decoding function. As an example, a set of tail bits can be flipped from all zeros to all ones.

Watermark Embedded FEC Output

Figure 21:
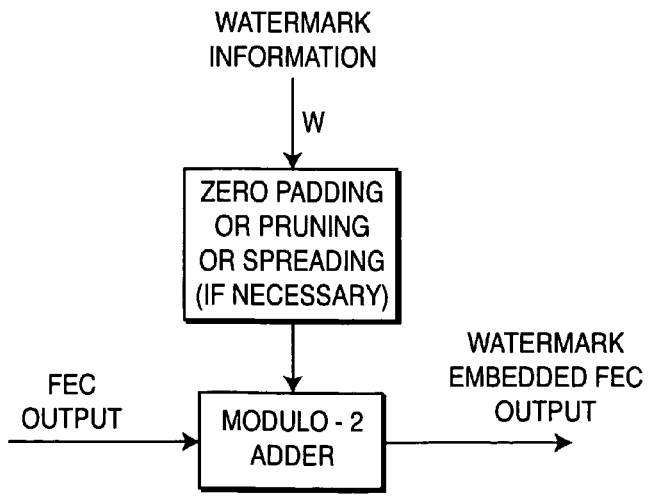
FIG. 21 shows an example of a watermark embedded FEC output in accordance with one embodiment of the present invention.

Watermark information w is input to mask FEC outputs where the masking may be performed by a modulo-2 adder to provide a watermark embedded FEC output, as shown in FIG. 21. If the length of watermark bits is not the same as the CRC length, then zero-bit padding or pruning or spreading (like rate matching) may be used for the modulo-2 add operation. Particularly, this watermark specific masking would work well with both convolutional coding and Turbo coding, taking into account their starting state and ending state known (zero state).

Transport Format Configuration (TFC) Based Watermarking

Figure 22:
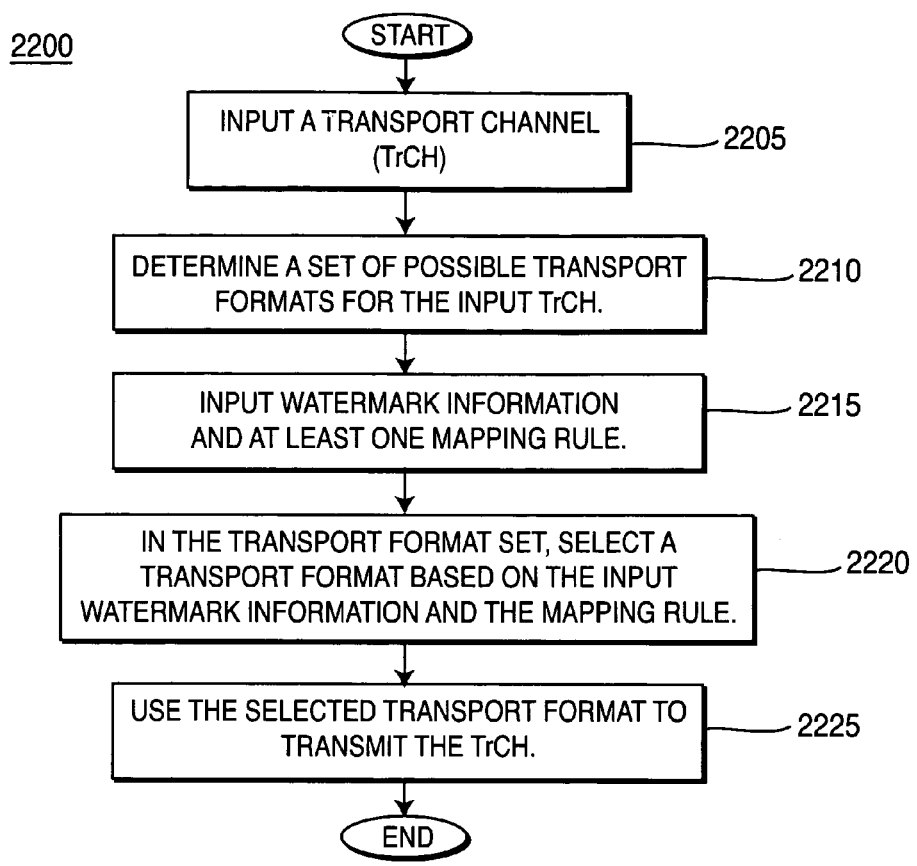
FIG. 22 is a flow diagram of a process including method steps for selecting the format of a TrCH based on watermark information and at least one mapping rule in accordance with one embodiment of the present invention.

In this case, TFCI (channelization code, SF, timeslot/frame, rate matching, etc) is determined based on watermark information. FIG. 22 shows a flow diagram of a process 2200 including method steps for configuring the transport format of a TrCH based on watermarking information and at least one mapping rule. When a transport channel is input (step 2205), a set of possible transport formats for the input TrCH is determined (step 2210). Watermark information and at least one mapping rule are input (step 2215). The input watermark information and the at least one mapping rule are used as a basis to select a transport format from the transport format set (step 2220). The selected transport format is used to transmit the TrCH (step 2225).

Compressed Mode

Figure 23:
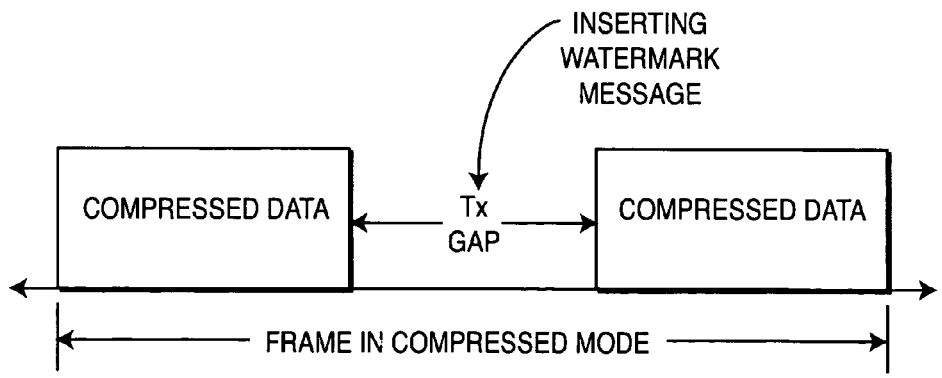
FIG. 23 shows an example of using a watermark in a compressed mode in accordance with one embodiment of the present invention.

Because wideband CDMA (WCDMA) uses continuous transmission and reception, a mobile TRU cannot make inter-system measurements with single receiver if there are no gaps generated between the WCDMA signals. Therefore, as shown in FIG. 23, a compressed mode is used for performing both for inter-frequency and inter-system measurements. In compressed mode, one or more transmission gap pattern sequences are active. Therefore, some frames are compressed and contain transmission gaps such that watermark information may be transmitted therein.

Discontinuous Transmission (DTX) Mode

If no data is provided by higher layers for transmission during the second phase of the downlink dedicated channel, then DTX is applied. In this case, the transmitter determines whether the DTX status is "ON" (meaning no data from higher layers for transmission). Upon the "ON" DTX status (DTX mode of CDMA data), watermark information is sent during a DTX period using a predetermined transport format (including channelization code(s) and timeslot(s)).

Other possible schemes of steganographically embedding digital information, such as watermark/signature information, into a CDMA communication signal include varying synchronization bits, using unspecified bit maps, using pad bits, code puncturing, pulse shaping, channel switching time, transmitting modulation accuracy, antenna polarization and network availability. Such schemes are more fully disclosed in copending patent application Ser. No. 11/035174 entitled "Orthogonal Frequency Division Multiplexing (OFDM) Method and Apparatus for Protecting and Authenticating Wirelessly Transmitted Digital Information" filed Jan. 12, 2005, and copending patent application Ser. No. 11/032780 entitled "Watermarks/Signatures for Wireless Communications" filed Jan. 11, 2005, which are incorporated by reference as if fully set forth.

Any combination among all the above-mentioned schemes may be considered for watermarking. For example, the scheme of stealing scrambling code chips for watermarking may be combined with the DPC based watermarking scheme.

Although the features and elements of the present invention are described in the preferred embodiments in particular combinations, each feature or element can be used alone without the other features and elements of the preferred embodiments or in various combinations with or without other features and elements of the present invention. Further, these elements may be implemented in a single IC, such as an application specific integrated circuit (ASIC), or in multiple ICs, discrete components, or a combination of discrete components and one or more ICs. Moreover, the present invention may be implemented in any type of wireless communication system.

While the present invention has been described in terms of the preferred embodiment, other variations which are within the scope of the invention as outlined in the claims below will be apparent to those skilled in the art.

What is claimed is:

1. A method of protecting and authenticating wirelessly transmitted digital information, the method comprising:
   steganographically embedding digital information in a code division multiple access (CDMA) communication signal by applying slow scrambled code jitter with respect to a carrier frequency and frequency-shift keying (FSK) modulation of the digital information placed on top of the jitter; and wirelessly transmitting the CDMA communication signal.

2. The method of claim 1 wherein the digital information is embedded in the CDMA communication signal as a watermark in a transmitting (TX) layer 2/3.

3. The method of claim 1 the digital information is embedded in the CDMA communication signal as a watermark in a transmitting (TX) physical layer.

4. The method of claim 1 wherein the digital information is embedded in the CDMA communication signal as a watermark in a transmitting (TX) radio frequency (RF) layer.

5. The method of claim 1 wherein the digital information is embedded in a frame quality indicator.

6. The method of claim 5 wherein the frame quality indicator includes a cyclic redundancy check (CRC).

7. The method of claim 1 the digital information is embedded in at least one encoder tail bit.

8. The method of claim 1 wherein the digital information is embedded in at least one reserved/erasure indicator.

9. The method of claim 1 wherein the digital information is mapped to a predefined frequency offset.

10. A method of protecting and authenticating wirelessly transmitted digital information, the method comprising:

steganographically embedding digital information in a code division multiple access (CDMA) communication signal, wherein particular chips are selected in at least one of a scrambling code and a channelization code, and the digital information is embedded in the selected chips; and wirelessly transmitting the CDMA communication signal.

11. A method of protecting and authenticating wirelessly transmitted digital information, the method comprising:

steganographically embedding digital information in a code division multiple access (CDMA) communication signal, wherein the digital information is mapped to physical channel combinations based on at least one channelization code and a spreading factor (SF) according to a predefined rule; and wirelessly transmitting the CDMA communication signal.

12. The method of claim 11 wherein the channelization code is an orthogonal variable spreading factor (OVSF) code.

13. A method of protecting and authenticating wirelessly transmitted digital information, the method comprising:

steganographically embedding digital information in a code division multiple access (CDMA) communication signal, wherein the digital information is represented as a relative gain or power offset between any pair of channelization codes; and wirelessly transmitting the CDMA communication signal.

14. A method of protecting and authenticating wirelessly transmitted digital information, the method comprising:

steganographically embedding digital information in a code division multiple access (CDMA) communication signal, wherein the digital information is mapped as a delay of a channelization code transmission; and wirelessly transmitting the CDMA communication signal.

15. The method of claim 1 wherein the digital information comprises at least one token.

16. The method of claim 1 wherein the digital information comprises at least one key.

17. The method of claim 1 wherein the digital information comprises at least one watermark.

18. The method of claim 1 wherein the digital information comprises at least one signature.

19. A method of protecting and authenticating wirelessly transmitted digital information, the method comprising:

steganographically embedding digital information in a code division multiple access (CDMA) communication signal, wherein the digital information is embedded in certain pilot symbols in a pilot channel; and wirelessly transmitting the CDMA communication signal.

20. The method of claim 1 wherein the digital information is embedded in a control channel.

21. The method of claim 1 wherein the digital information is embedded in a data channel.

22. A method of protecting and authenticating wirelessly transmitted digital information, the method comprising:

steganographically embedding digital information in a code division multiple access (CDMA) communication signal, wherein the digital information is embedded in two different data symbols every other symbol period, wherein the two different data symbols are simultaneously transmitted by respective antennas of a transmitter having two antennas; and wirelessly transmitting the CDMA communication signal.

23. A method of protecting and authenticating wirelessly transmitted digital information, the method comprising:

steganographically embedding digital information in a code division multiple access (CDMA) communication signal, wherein the digital information is directly transported by defining a new physical channel or field; and wirelessly transmitting the CDMA communication signal.

24. The method of claim 1 further comprising:

treating the digital information as dirty paper coding (DPC) encoded information; and treating any other CDMA signals as side information.

25. The method of claim 1 further comprising:

combining bits of the digital information with bits of a cyclic redundancy check (CRC).

26. A method of protecting and authenticating wirelessly transmitted digital information, the method comprising:

steganographically embedding digital information in a code division multiple access (CDMA) communication signal, wherein the digital information is used to initialize a shift register of a cyclic redundancy check (CRC) generator prior to CRC generation for data; and wirelessly transmitting the CDMA communication signal.

27. A method of protecting and authenticating wirelessly transmitted digital information, the method comprising:

steganographically embedding digital information in a code division multiple access (CDMA) communication signal, wherein the digital information is used to initialize a shift register of a forward error correction (FEC) encoder prior to channel coding for data; and wirelessly transmitting the CDMA communication signal.

28. The method of claim 1 further comprising:

puncturing bits of a forward error correction (FEC) output;

inserting bits of the digital information in locations of the FEC output punctured bits; and providing a cyclic redundancy check (CRC) output embedded with the digital information bits.

29. A method of protecting and authenticating wirelessly transmitted digital information, the method comprising:

steganographically embedding digital information in a code division multiple access (CDMA) communication signal, wherein tail bits of a forward error correction (FEC) output are encoded with the digital information rather than being set to a binary value of zero; and wirelessly transmitting the CDMA communication signal.

30. A method of protecting and authenticating wirelessly transmitted digital information, the method comprising:
steganographically embedding digital information in a code division multiple access (CDMA) communication signal, wherein the digital information is used to mask a forward error correction (FEC) output; and
wirelessly transmitting the CDMA communication signal.

31. A method of protecting and authenticating wirelessly transmitted digital information, the method comprising:
steganographically embedding digital information in a code division multiple access (CDMA) communication signal, wherein a set of transport formats for a transport channel (TrCH) is determined, a transport format is selected from the transport format set based on the digital information and at least one mapping rule, and the selected transport format is used to transmit the TrCH; and
wirelessly transmitting the CDMA communication signal.

32. A method of protecting and authenticating wirelessly transmitted digital information, the method comprising:
steganographically embedding digital information in a code division multiple access (CDMA) communication signal, wherein the digital information is sent during at least one transmission gap of the CDMA communication signal when it is in a compressed mode; and
wirelessly transmitting the CDMA communication signal.

33. A method of protecting and authenticating wirelessly transmitted digital information, the method comprising:
steganographically embedding digital information in a code division multiple access (CDMA) communication signal, wherein the digital information is sent during a period of an activated discontinuous transmission mode using a predetermined transport format; and
wirelessly transmitting the CDMA communication signal.

34. A wireless transmit/receive unit (WTRU) comprising:
a transmitter which steganographically embeds digital information in a code division multiple access (CDMA) communication signal and wirelessly transmits the CDMA communication signal, wherein the transmitter applies slow scrambled code jitter with respect to a carrier frequency and frequency-shift keying (FSK) modulation of the digital information placed on top of the jitter; and
a receiver which receives a CDMA communication signal and extracts steganographically embedded digital information from the received CDMA communication signal.

35. The WTRU of claim 34 wherein the transmitter embeds the digital information in a frame quality indicator.

36. The WTRU of claim 35 wherein the frame quality indicator includes a cyclic redundancy check (CRC).

37. The WTRU of claim 34 wherein the transmitter embeds the digital information in at least one encoder tail bit.

38. The WTRU of claim 34 wherein the transmitter embeds the digital information in at least one reserved/erasure indicator.

39. The WTRU of claim 34 wherein the transmitter maps the digital information to a predefined frequency offset.

40. The WTRU of claim 34 wherein the receiver synchronizes a local descrambler to generate the same code jitter.

41. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter selects particular chips in at least one of a scrambling code and a channelization code, and embeds the digital information in the selected chips.

42. The WTRU of claim 41 wherein the receiver determines the particular chips and extracts the digital information from the particular chips.

43. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter maps the digital information to physical channel combinations based on at least one channelization code and a spreading factor (SF) according to a predefined rule.

44. The WTRU of claim 43 wherein the channelization code is an orthogonal variable spreading factor (OVSF) code.

45. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter represents the digital information as a relative gain or power offset between any pair of channelization codes.

46. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter maps the digital information as a delay of a channelization code transmission.

47. The WTRU of claim 34 wherein the digital information comprises at least one token.

48. The WTRU of claim 34 wherein the digital information comprises at least one key.

49. The WTRU of claim 34 wherein the digital information comprises at least one watermark.

50. The WTRU of claim 34 wherein the digital information comprises at least one signature.

51. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter embeds the digital information in certain pilot symbols in a pilot channel.

52. The WTRU of claim 51 wherein the receiver extracts the digital information from the certain pilot symbols in the pilot channel.

53. The WTRU of claim 34 wherein the transmitter embeds the digital information in a control channel.

54. The WTRU of claim 34 wherein the transmitter embeds the digital information in a data channel.

55. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter comprises two antennas, whereby the transmitter embeds the digital information in two different data symbols every other symbol period, wherein the two different data symbols are simultaneously transmitted by the respective ones of the two antennas.

56. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the digital information is directly transported by defining a new physical channel or field.

57. The WTRU of claim 34 wherein the digital information is treated as dirty paper coding (DPC) encoded information and any other CDMA signals are treated as side information.

58. The WTRU of claim 34 wherein the transmitter combines bits of the digital information with bits of a cyclic redundancy check (CRC).

59. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter uses the digital information to initialize a shift register of a cyclic redundancy check (CRC) generator prior to CRC generation for data.

60. A wireless transmit/receive unit (WTRU) comprising:
a transmitter which steganographically embeds digital information in a CDMA communication signal and wirelessly transmits the CDMA communication signal; and
a receiver which receives a CDMA communication signal and extracts steganographically embedded digital information from the received CDMA communication signal, wherein the transmitter uses the digital information to initialize a shift register of a forward error correction (FEC) encoder prior to channel coding for data.

61. The WTRU of claim 34 wherein the transmitter punctures bits of a forward error correction (FEC) output, inserts bits of the digital information in locations of the FEC output punctured bits and provides a cyclic redundancy check (CRC) output embedded with the digital information bits.

62. The WTRU of claim 61 wherein the receiver extracts the digital information from the punctured bit locations of the FEC output.

63. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter encodes tail bits of a forward error correction (FEC) output with the digital information rather than setting the tail bits to a binary value of zero.

64. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter uses the digital information to mask a forward error correction (FEC) output.

65. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter determines a set of transport formats for a transport channel (TrCH), selects a transport format from the transport format set based on the digital information and at least one mapping rule, and uses the selected transport format to transmit the TrCH.

66. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter sends the digital information during at least one transmission gap of the CDMA communication signal when it is in a compressed mode.

67. A wireless transmit/receive unit (WTRU) comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter sends the digital information during a period of an activated discontinuous transmission (DTX) mode using a predetermined transport format.

68. A base station comprising:
a transmitter which steganographically embeds digital information in a code division multiple access (CDMA) communication signal and wirelessly transmits the CDMA communication signal, wherein the transmitter applies slow scrambled code jitter with respect to a carrier frequency and frequency-shift keying (FSK) modulation of the digital information placed on top of the jitter; and
a receiver which receives a CDMA communication signal and extracts steganographically embedded digital information from the received CDMA communication signal.

69. The base station of claim 68 wherein the transmitter embeds the digital information in a frame quality indicator.

70. The base station of claim 69 wherein the frame quality indicator includes a cyclic redundancy check (CRC).

71. The base station of claim 68 wherein the transmitter embeds the digital information in at least one encoder tail bit.

72. The base station of claim 68 wherein the transmitter embeds the digital information in at least one reserved/erasure indicator.

73. The base station of claim 68 wherein the transmitter maps the digital information to a predefined frequency offset.

74. The base station of claim 68 wherein the receiver synchronizes a local descrambler to generate the same code jitter.

75. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter selects particular chips in at least one of a scrambling code and a channelization code, and embeds the digital information in the selected chips.

76. The base station of claim 75 wherein the receiver determines the particular chips and extracts the digital information from the particular chips.

77. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter maps the digital information to physical channel combinations based on at least one channelization code and a spreading factor (SF) according to a predefined rule.

78. The base station of claim 77 wherein the channelization code is an orthogonal variable spreading factor (OVSF) code.

79. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter represents the digital information as a relative gain or power offset between any pair of channelization codes.

80. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter maps the digital information as a delay of a channelization code transmission.

81. The base station of claim 68 wherein the digital information comprises at least one token.

82. The base station of claim 68 wherein the digital information comprises at least one key.

83. The base station of claim 68 wherein the digital information comprises at least one watermark.

84. The base station of claim 68 wherein the digital information comprises at least one signature.

85. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter embeds the digital information in certain pilot symbols in a pilot channel.

86. The base station of claim 85 wherein the receiver extracts the digital information from the certain pilot symbols in the pilot channel.

87. The base station of claim 68 wherein the transmitter embeds the digital information in a control channel.

88. The base station of claim 68 wherein the transmitter embeds the digital information in a data channel.

89. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter comprises two antennas, whereby the transmitter embeds the digital information in two different data symbols every other symbol period, wherein the two different data symbols are simultaneously transmitted by the respective ones of the two antennas.

90. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the digital information is directly transported by defining a new physical channel or field.

91. The base station of claim 68 wherein the digital information is treated as dirty paper coding (DPC) encoded information and any other CDMA signals are treated as side information.

92. The base station of claim 68 wherein the transmitter combines bits of the digital information with bits of a cyclic redundancy check (CRC).

93. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter uses the digital information to initialize a shift register of a cyclic redundancy check (CRC) generator prior to CRC generation for data.

94. A base station comprising:
a transmitter which steganographically embeds digital information in a CDMA communication signal and wirelessly transmits the CDMA communication signal; and
a receiver which receives a CDMA communication signal and extracts steganographically embedded digital information from the received CDMA communication signal, wherein the transmitter uses the digital information to initialize a shift register of a forward error correction (FEC) encoder prior to channel coding for data.

95. The base station of claim 68 wherein the transmitter punctures bits of a forward error correction (FEC) output, inserts bits of the digital information in locations of the FEC output punctured bits and provides a cyclic redundancy check (CRC) output embedded with the digital information bits.

96. The base station of claim 95 wherein the receiver extracts the digital information from the punctured bit locations of the FEC output.

97. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter encodes tail bits of a forward error correction (FEC) output with the digital information rather than setting the tail bits to a binary value of zero.

98. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter uses the digital information to mask a forward error correction (FEC) output.

99. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter determines a set of transport formats for a transport channel (TrCH), selects a transport format from the transport format set based on the digital information and at least one mapping rule, and uses the selected transport format to transmit the TrCH.

100. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter sends the digital information during at least one transmission gap of the CDMA communication signal when it is in a compressed mode.

101. A base station comprising:
a transmitter which steganographically embeds digital information in a code division multiple access (CDMA) communication signal and wirelessly transmits the CDMA communication signal; and
a receiver which receives a CDMA communication signal and extracts steganographically embedded digital information from the received CDMA communication signal, wherein the transmitter sends the digital information during a period of an activated discontinuous transmission (DTX) mode using a predetermined transport format.

* * * * *

UNITED STATES PATENT AND TRADEMARK OFFICE
CERTIFICATE OF CORRECTION

PATENT NO. : 7,415,043 B2
APPLICATION NO. : 11/034987
DATED : August 19, 2008
INVENTOR(S) : Kaewell, Jr. et al.

It is certified that error appears in the above-identified patent and that said Letters Patent is hereby corrected as shown below:

ON THE TITLE PAGE

At item (56), OTHER PUBLICATIONS, page 2, right column, line 7, after the word "Applied", delete "Cryptogaphyy" and insert therefor --Cryptography--.

At item (56), OTHER PUBLICATIONS, page 2, right column, line 11, after the word "Protocols", delete "(ICNP '98)" and insert therefor --(ICNP '02)--.

At item (56), OTHER PUBLICATIONS, page 2, right column, line 16, after the word "Applied", delete "Cryptogaphyy" and insert therefor --Cryptography--.

IN THE SPECIFICATION

At column 1, line 31, after the word "nodes", delete "creates" and insert therefor --create--.

At column 1, line 64, after the word "security", delete "issued", and insert therefor --issues--.

At column 6, delete "Equation (1)", and insert therefor
--$s_w = E\{s,w\}$ or $d_w = E\{d,w\}$--.

At column 7, line 13, after the word "layer", delete "processint" and insert therefor --processing--.

At column 8, delete "Equation (2)" and insert therefor --$s_w = E_{EPCH}\{s,w\}$--.

At column 9, delete "Equation (3)" and insert therefor --$s_w = E_k\{s,w\}$--.

At column 10, line 47, after the word "code", delete "SC" and insert therefor --$S_c$--.

At column 11, line 24, before the word "scrambling", delete "with".

UNITED STATES PATENT AND TRADEMARK OFFICE
CERTIFICATE OF CORRECTION

PATENT NO. : 7,415,043 B2
APPLICATION NO. : 11/034987
DATED : August 19, 2008
INVENTOR(S) : Kaewell, Jr. et al.

It is certified that error appears in the above-identified patent and that said Letters Patent is hereby corrected as shown below:

At column 11, line 40, after the word "represented", insert --as--.

At column 12, line 36, before the word "data", delete "weighed" and insert therefor --weighted--.

At column 12, line 43, after the words "(or power)", delete "$P_{i,}\ P_{k,}$" and insert therefor --$p_{i,}\ p_{k,}$--.

At column 12, line 44, after the word "codes", delete "an" and insert therefor --can--.

At column 12, line 65, after the words "which is", delete "know" and insert therefor --known--.

At column 13, line 1, after the word "and", delete "$P_k' = P_k - B/2$," and insert therefor --$p_k' = p_k - B/2$--.

At column 13, line 44, before the word ". Otherwise", delete " $\vec{d}\ 2*)$" and insert therefor -- $\vec{d}\ _2*)$--.

At column 13, line 54, after the word "diversity", delete "techniques" and insert therefor --technique--.

At column 14, delete lines 65 - 67, and insert therefor
   -- $-g_{CRC12}(D) = D^{12}+D^{11}+D^3+D^2+D+1$; and
   $-g_{CRC8}(D) = D^8+D^7+D^4+D^3+D+1$.--.

At column 16, line 13, after the word "both", delete "for".

UNITED STATES PATENT AND TRADEMARK OFFICE
CERTIFICATE OF CORRECTION

PATENT NO. : 7,415,043 B2
APPLICATION NO. : 11/034987
DATED : August 19, 2008
INVENTOR(S) : Kaewell, Jr. et al.

It is certified that error appears in the above-identified patent and that said Letters Patent is hereby corrected as shown below:

IN THE CLAIMS

At claim 3, column 17, line 8, after the words "claim 1", insert --wherein--.

At claim 7, column 17, line 18, after the words "claim 1" insert --wherein--.

Signed and Sealed this

Tenth Day of March, 2009

JOHN DOLL
*Acting Director of the United States Patent and Trademark Office*